US012564882B2

(12) United States Patent
Antony et al.

(10) Patent No.: US 12,564,882 B2
(45) Date of Patent: Mar. 3, 2026

(54) METHOD FOR ADDITIVE MANUFACTURING OF A WALL FOR A TURBINE ENGINE, COMPRISING AT LEAST ONE COOLING APERTURE

(71) Applicant: SAFRAN AIRCRAFT ENGINES, Paris (FR)

(72) Inventors: Pierre Antony, Moissy-Cramayel (FR); Sébastien Yohann Pouzet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/995,203

(22) PCT Filed: Mar. 26, 2021

(86) PCT No.: PCT/FR2021/050532
§ 371 (c)(1),
(2) Date: Sep. 30, 2022

(87) PCT Pub. No.: WO2021/198598
PCT Pub. Date: Oct. 7, 2021

(65) Prior Publication Data
US 2024/0009733 A1     Jan. 11, 2024

(30) Foreign Application Priority Data

Apr. 3, 2020     (FR) ........................................ 2003347
Apr. 3, 2020     (FR) ........................................ 2003348

(51) Int. Cl.
B22F 5/00         (2006.01)
B22F 10/28       (2021.01)
(Continued)

(52) U.S. Cl.
CPC .............. B22F 5/009 (2013.01); B22F 10/28 (2021.01); F23R 3/002 (2013.01); B33Y 10/00 (2014.12);
(Continued)

(58) Field of Classification Search
CPC .. B22F 5/009; B22F 10/28; B22F 5/04; B22F 10/366; B22F 10/385; F23R 3/002;
(Continued)

(56) References Cited

U.S. PATENT DOCUMENTS 5,291,732 A       3/1994  Halila
2007/0256417 A1  11/2007  Parker
(Continued)

FOREIGN PATENT DOCUMENTS

DE       102014226839 A1     6/2016
DE       102016224060 A1 *  6/2018
EP           3127635 A1 *  2/2017  .............. B22F 10/00

OTHER PUBLICATIONS

DE-102016224060-A1, Geisen. machine translation. (Year: 2018).*
(Continued)

*Primary Examiner* — John A Hevey
(74) *Attorney, Agent, or Firm* — McDonald Hopkins LLC

(57)     ABSTRACT

A method is provided for additive manufacturing of a wall for a turbine engine, the wall including a first cooling aperture. The manufacturing method includes additively manufacturing the wall by selective melting or selective sintering on a powder bed. The wall is manufactured at least partially around the first cooling aperture with at least one lower zone that has a minimum length between 0.01 and 0.4 mm and/or with a lower zone that has a total thickness between 0.06 and 0.22 mm.

18 Claims, 10 Drawing Sheets

(51) Int. Cl.
    *B33Y 10/00*       (2015.01)
    *F23R 3/00*        (2006.01)
    *B33Y 80/00*       (2015.01)

(52) U.S. Cl.
    CPC ..... *B33Y 80/00* (2014.12); *F23R 2900/00018*
        (2013.01); *F23R 2900/03042* (2013.01)

(58) Field of Classification Search
    CPC .. F23R 2900/00018; F23R 2900/03042; F23R
           3/06; F23R 3/50; B33Y 10/00; B33Y
           80/00; B33Y 50/02; Y02P 10/25; Y02T
                                50/60
    See application file for complete search history.

(56)              References Cited

U.S. PATENT DOCUMENTS

| | | |
|---|---|---|
| 2010/0095680 A1 | 4/2010 | Rudrapatna et al. |
| 2011/0185739 A1 | 8/2011 | Bronson et al. |
| 2016/0303656 A1 | 10/2016 | Lacy et al. |
| 2017/0064868 A1* | 3/2017 | Rush ................... F28D 15/0233 |
| 2018/0031238 A1 | 2/2018 | Harding |
| 2019/0041059 A1* | 2/2019 | Slavens .................... F23R 3/60 |

OTHER PUBLICATIONS

International Search Report for issued in Application No. PCT/FR2021/050532 dated Jul. 14, 2021.
Written Opinion for PCT/FR2021/050532 dated Jul. 14, 2021.
Search Report issued in French Patent Application No. 2003347 dated Nov. 30, 2020.
Search Report issued in French Patent Application No. 2003348 dated Nov. 9, 2020.
Wadea, Ameen, et al. "Manufacturability of Overhanging Holes Using Electron Beam Melting", Metals, May 30, 2018, pp. 1-24, vol. 8, No. 6, XP055736680.

\* cited by examiner

METHOD FOR ADDITIVE MANUFACTURING OF A WALL FOR A TURBINE ENGINE, COMPRISING AT LEAST ONE COOLING APERTURE

This is the National Stage of PCT international application PCT/FR2021/050532, filed on Mar. 26, 2021 entitled "METHOD FOR ADDITIVE MANUFACTURING OF A WALL FOR A TURBINE ENGINE, COMPRISING AT LEAST ONE COOLING APERTURE", which claims the priority of French Patent Application No. 2003347 filed Apr. 3, 2020 and French Patent Application No. 2003348 filed Apr. 3, 2020, all of which are incorporated herein by reference in their entireties.

TECHNICAL FIELD

The invention is concerned with the technical field of additive manufacturing on a powder bed, also known as 3D printing. More specifically, it relates to a method for manufacturing a wall for a turbine engine, comprising a cooling aperture, the wall being manufactured by depositing powder layer by layer, partly solidified by selective melting or selective sintering by a laser beam or by an electron beam.

The invention is also concerned with the general technical field of aircraft turbine engines such as turbojet and turboprop engines. It relates to a combustion chamber for a turbine engine.

BACKGROUND OF THE INVENTION

Selective melting or selective sintering methods on a powder bed make it possible to easily make metallic or ceramic parts such as turbine engine parts which are subjected to significant mechanical and/or thermal stresses.

Such methods are especially known under the acronyms SLM (Selective Laser Melting), SLS (Selective Laser Sintering), DMLS (Direct Metal Laser Sintering) and EBM (Electron Beam Melting).

These methods generally comprise a step of depositing a first powder layer in a manufacturing tank, the bottom of which is formed by a translationally movable plate, using a roller or scraper type spreading means, followed by a step of heating a predefined zone in the powder layer by means of a laser beam or an electron beam. The energy supplied by this beam causes local melting or sintering of the powder, which solidifies to form a first layer of the part. This part is especially a wall for a turbine engine.

The plate is then lowered by a distance corresponding to the thickness of one layer, and then a second powder layer is then brought by the spreading means onto the previous layer. Subsequently, a second layer of the part is formed using the beam. These steps are repeated until the part is completely manufactured.

It is particularly difficult to produce by additive manufacturing, in particular in a reproducible manner, a turbine engine wall with cooling holes that are small and substantially uniform, especially when these cooling holes extend substantially perpendicular to the turbine engine wall.

A turbine engine annular combustion chamber comprises two coaxial inner and outer annular walls which are connected together at their upstream ends through a chamber bottom wall and a fairing. The chamber bottom wall includes openings for mounting injection systems in which fuel injectors are engaged.

The inner wall and outer wall of some known combustion chambers are coated with heat shields to thermally protect them from hot gases generated by combustion.

The inner wall and the outer wall of known combustion chambers have cooling apertures passing therethrough to cool these walls by a film of cooler air, which comes from a diffuser of the combustion chamber, to thermally protect these walls from hot gases in the combustion chamber.

Nevertheless, it is useful to further protect the inner wall and outer wall of the combustion chamber from heat generated by combustion, especially to allow combustion at higher temperatures and to increase efficiency of a turbine engine.

DISCLOSURE OF THE INVENTION

The invention aims at solving at least partially problems encountered in the solutions of prior art.

In this respect, one object of the invention is method for additive manufacturing of a wall for a turbine engine, the wall comprising a first cooling aperture. The manufacturing method comprises additive manufacturing of the wall by selective melting or selective sintering on a powder bed.

According to the invention, the wall is at least partially manufactured around the first cooling aperture with a lower zone that has a total thickness of between 0.06 and 0.22 mm. The lower zone is manufactured with an energy input per unit length that is lower than that for manufacturing an intermediate zone that forms most of the wall volume.

By virtue of the additive manufacturing method according to the invention, the manufacture of a turbine engine wall with at least a first cooling aperture of small dimensions is facilitated. The geometry of the first cooling aperture is especially improved.

The wall manufacturing method tends to be more reproducible. It also promotes production of first cooling apertures that are more uniform in the wall, including when these first cooling apertures extend substantially perpendicular to an external surface of the turbine engine wall.

According to one feature, the lower zone is manufactured with a minimum lower zone length that is between 0.01 and 0.4 mm. The minimum lower zone length is a minimum powder solidification length for the lower zone to be able to be formed.

In particular, the minimum length of the lower zone is lowered and/or the total thickness of the lower zone is increased, thereby manufacturing a lower zone on a larger volume. The larger volume of the lower zone in the first region makes it possible to reduce manufacturing defects in the first cooling aperture.

A lower zone, also known as a "downskin", is especially a zone that is formed from at least one solidified powder layer and that is manufactured with an energy input per unit length that is lower than that for manufacturing an intermediate zone.

An intermediate zone, also known as an "inskin", is especially a zone which is formed from at least one solidified powder layer. The intermediate zones form most of the volume of the wall. Each intermediate zone is especially formed with an energy input per unit length that is standard for the manufacture of the wall.

An upper zone, also known as an "upskin", is especially a zone which is formed by at least one solidified powder layer and which is manufactured with an energy input per unit length which is substantially equal to that used to manufacture an intermediate zone but with a double energy exposure relative to the intermediate zone.

An energy input per unit length is especially an amount of energy delivered to the material, in this case powder, per unit distance.

Preferably, the lower zone has a minimum length which is substantially equal to 0.05 mm.

Preferably, the lower zone has a thickness which is substantially equal to 0.12 mm.

According to another feature, the first wall region is manufactured without an upper zone.

According to another feature, the first wall region is manufactured with an upper zone thickness that is less than or equal to 0.06 mm.

In the absence of an upper zone or with an upper zone of smaller thickness, manufacturing defects of the first cooling aperture are especially reduced.

According to one feature, the lower zone is located in an upper portion of the first cooling aperture, especially an upper edge of the first cooling aperture, when the wall is manufactured substantially vertically by additive manufacturing on a support.

The support is especially a manufacturing plate, with the wall extending perpendicular to the manufacturing plate during additive manufacturing of the wall.

It is particularly difficult to make the upper portion of the first cooling aperture by additive manufacturing in the wall without displacement of material, for example powder, downwardly. The preponderance of the lower zone in the upper portion of the cooling aperture makes it easier to make the cooling aperture.

According to one feature, the lower zone is made by a first energy input per unit length to the powder bed which is between 0.0200 J/mm and 0.0300 J/mm.

Preferably, the lower zone is made by a first energy input per unit length to the powder bed which is substantially equal to 0.0250 J/mm.

According to another feature, an intermediate zone around the first cooling aperture is manufactured by a second energy input per unit length to the powder bed which is between 0.1300 J/mm and 0.1950 J/mm.

Preferably, the intermediate zone around the first cooling aperture is manufactured by a second energy input per unit length to the powder bed which is substantially equal to 0.1625 J/mm.

According to one feature, the wall is manufactured around the cooling aperture with an upper zone which is manufactured by a third energy input per unit length to the powder bed which is between 0.1300 J/mm and 0.1950 J/mm.

Preferably, the wall is manufactured around the cooling aperture with an upper zone that is manufactured by a third energy input per unit length to the powder bed that is substantially equal to 0.1625 J/mm.

Preferably, the third energy input per unit length is substantially equal to the second energy input per unit length with double energy exposure of the upper zone relative to the intermediate zone.

The low value of the first energy input per unit length relative to the second energy input per unit length and/or the third energy input per unit length allows less powder to be molten/agglomerated when manufacturing a lower zone than when manufacturing an intermediate or upper zone. This results in a decrease in the manufacturing defects of the first cooling aperture which is made from a larger volume of the lower zone.

According to another feature, the first cooling aperture extends about a longitudinal axis of the first cooling aperture which is substantially orthogonal to an external surface of the wall.

Preferably, the wall extends substantially perpendicular to a manufacturing plate during additive manufacturing of the wall.

This makes it all the more difficult to make a first cooling aperture by additive manufacturing with this orientation of the first cooling aperture and/or the wall, and the manufacturing method according to the invention is then all the more advantageous.

According to one feature, the first cooling aperture is digitally modelled with a substantially oval transverse surface to be manufactured by selective melting or selective powder bed sintering with a substantially circular transverse cross-section.

The prior modelling of the first cooling aperture with a shape different from the intended shape of this aperture especially allows for the downward displacement of material during powder melting/agglomeration at the upper edge of the first cooling aperture.

According to another feature, the wall comprises at least one second cooling aperture. The second cooling aperture is oriented about a longitudinal axis of the second cooling aperture which is tilted relative to the external surface of the wall by an angle of between 5° and 45° in at least one sectional plane of the wall, preferably about 20°.

The sectional plane is especially a longitudinal sectional plane of the wall which includes a normal to the external surface of the wall.

The additive manufacturing method especially makes it possible to make a second cooling aperture with an orientation, especially a tilt, relative to the wall which would be difficult to achieve with a drilling method known from the state of the art, such as laser drilling.

According to one feature, the second cooling aperture comprises an inlet and/or an outlet which comprises a rounded part.

The rounded part at the inlet and/or outlet of the second cooling aperture tends to limit unwanted material deposition at the inlet and/or outlet of the second cooling aperture.

Another object of the invention is an annular combustion chamber for a turbine engine. The combustion chamber comprises an inner wall, an outer wall and a chamber bottom. The inner wall and the outer wall are annular about a longitudinal axis of the combustion chamber. The chamber bottom mechanically connects the inner wall and the outer wall.

According to the invention, at least a first one of the inner wall and the outer wall comprises a first annular partition and a second annular partition. The second partition is radially spaced from the first partition to form a cooling duct for the first wall together with the first partition.

The cooling duct comprises an inlet wall and an outlet wall which extend between the first partition and the second partition. At least one of the inlet wall and the outlet wall has at least one cooling aperture passing therethrough which has an axial component along the longitudinal axis of the combustion chamber.

By virtue of the combustion chamber according to the invention, cooling of the first wall is improved. In particular, cooling air circulation from the inlet wall to the outlet wall of the cooling duct enables improvement in cooling of the combustion chamber. The cooling duct especially promotes continuous and homogeneous circulation of cooling air in the first wall. The cooling of the first wall is all the more effective as the cooling air circulating in the cooling duct tends to be separated from the hot combustion gases, for example through the first partition.

The invention may optionally include one or more of the following characteristics in combination or not.

According to one feature, the inlet wall has at least one cooling aperture passing therethrough which has an axial component along the longitudinal axis of the combustion chamber. The outlet wall has at least one cooling aperture passing therethrough which has an axial component along the longitudinal axis of the combustion chamber.

Cooling of the first wall is further improved by promoting circulation of cooling air from the inlet wall to the outlet wall through the cooling apertures of these two walls.

According to another feature, the first wall has primary apertures therethrough for introducing a primary flux into the combustion chamber.

According to another feature, the first wall has dilution apertures passing therethrough for introducing a dilution flux into the combustion chamber.

In particular, the cooling duct does not interfere with the combustion in the combustion chamber, allowing the combustion to be fed by a primary flux and/or by a dilution flux.

According to another feature, the first partition has at least one cooling aperture passing therethrough having a radial component, especially cooling apertures which have a radial component.

These cooling apertures with a radial component especially make it possible to film-cool the first partition which is close to the hot combustion gases, to improve cooling of the first wall. These cooling apertures with a radial component also allow additional air to be introduced into the combustion chamber.

According to one feature, the combustion chamber comprises a second edge tilted with respect to the inlet wall to form an opening which flares upstream and is designed to direct cooling fluid to the cooling duct inlet.

The second edge tends to increase the amount of air circulating through the cooling duct.

According to another feature, the first wall comprises an attachment rim for attaching the first wall to a fairing and/or to a chamber bottom of a combustion chamber. The attachment rim comprises a first edge tilted with respect to the inlet wall and through which at least one aperture for introducing fluid into the combustion chamber passes.

The first edge tends to increase the amount of air introduced into the combustion chamber, while connecting the first wall to the chamber bottom and/or the fairing.

Preferably, the first edge is substantially parallel to the second edge.

According to one feature, a radial extent of the cooling duct narrows downstream from the inlet wall of the cooling duct over at least part of the axial extent of the cooling duct.

This accelerates air in the cooling duct, thereby increasing the cooling flow rate to cool the first wall. Cooling air pressure losses are limited when cooling air enters the cooling duct.

According to one feature, a radial extent of the cooling duct widens downstream to the outlet wall of the cooling duct over at least part of the axial extent of the cooling duct.

According to another feature, the cooling duct outlet wall has at least one aperture passing therethrough for attachment of the first wall to a turbine engine wall.

According to another feature, the outlet wall is radially oriented.

The outlet wall especially allows the first wall to be connected to a turbine wall, while discharging air from the cooling duct. The air pressure tends to increase at the outlet of the cooling duct, especially to supply a high pressure turbine with cooling air.

According to one feature, the first wall comprises a stiffener which extends between the first partition and the second partition to increase mechanical strength of the first wall.

The first wall especially has a satisfactory mechanical strength compared to a solid wall despite the first wall, the second wall and the cooling duct.

According to one feature, the first wall comprises a support for a spark plug which is configured to guide and support the spark plug in the combustion chamber. The support is especially made as one piece with the first wall.

According to another feature, the second wall among the inner wall and the outer wall comprises an annular third partition and an annular fourth partition. The fourth partition is radially spaced from the third partition to form a second cooling duct for cooling the second wall together with the third partition.

The second cooling duct comprises a second inlet wall and a second outlet wall which extend between the third partition and the fourth partition.

At least one of the second inlet wall and the second outlet wall has at least one cooling aperture passing therethrough, which has an axial component along the longitudinal axis of the combustion chamber.

Cooling of the outer wall and cooling of the inner wall are thereby improved in the combustion chamber.

The invention also relates to a turbine engine comprising a combustion chamber as defined above. Preferably, the turbine engine is an aircraft turbine engine such as a turbojet or turboprop engine.

The invention also concerns a method for manufacturing a combustion chamber as defined above, wherein the first wall and/or the second wall is manufactured by selective melting or by selective sintering on a powder bed, especially by a laser.

The first wall may be additively manufactured. It may have a complex shape.

BRIEF DESCRIPTION OF THE DRAWINGS

The present invention will be better understood upon reading the description of exemplary embodiments, given purely by way of indicating and in no way limiting purposes, with reference to the appended drawings in which.

DETAILED DISCLOSURE OF PARTICULAR EMBODIMENTS

Identical, similar or equivalent parts of the different figures bear the same numerical references so as to facilitate switching from one figure to another.

Figure 1:
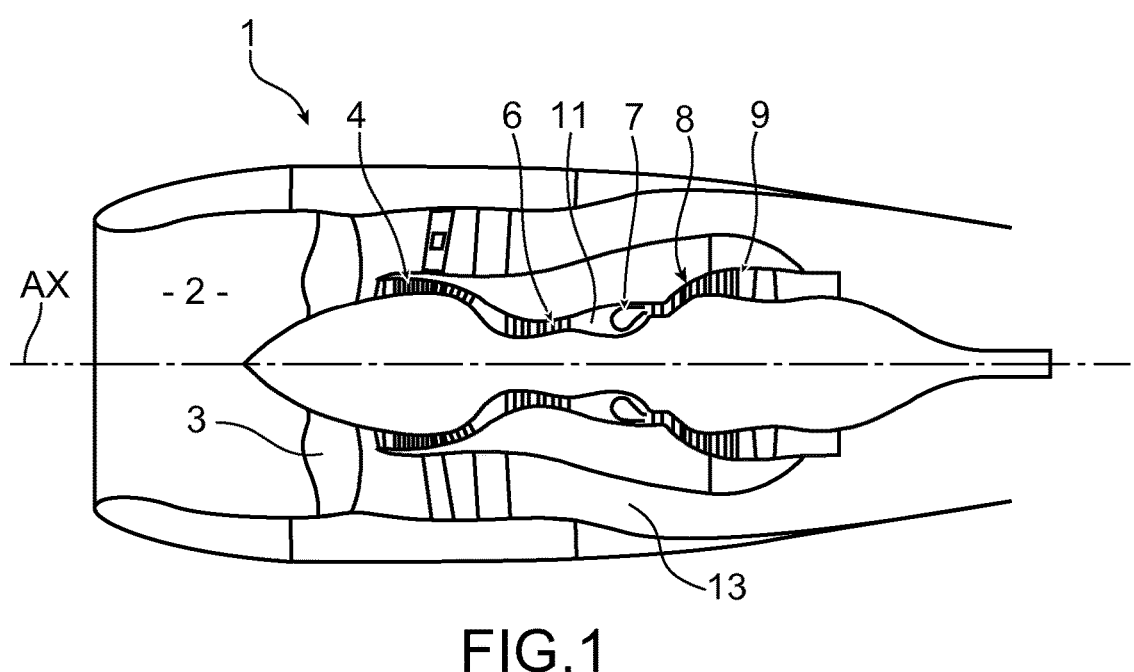
FIG. 1 represents a turbine engine comprising a wall which is manufactured according to an additive manufacturing method according to a first embodiment of the invention.

FIG. 1 represents a dual flow, twin-spool turbine engine 1. The turbine engine 1 is a turbojet engine which has a shape of revolution about a longitudinal axis AX.

The turbine engine 1 comprises, in the path of a primary stream 11 of a primary flux, an air inlet duct 2, a fan 3, a low pressure compressor 4, a high pressure compressor 6, a combustion chamber 7, a high pressure turbine 8 and a low pressure turbine 9.

Generally speaking, the term "air" refers to any gas that can serve as an oxidant in the turbine engine 1.

The low pressure compressor 4, the high pressure compressor 6, the high pressure turbine 8 and the low pressure turbine 9 delimit a secondary stream 13 of flowing a secondary flux that bypasses them.

The high pressure compressor 6 and the high pressure turbine 8 are mechanically connected through a drive shaft of the high pressure compressor 6, so as to form a high pressure spool of the turbine engine 1. Similarly, the low pressure compressor 4 and the low pressure turbine 9 are mechanically connected through a turbine engine shaft 1, so as to form a low pressure spool of the turbine engine 1.

The low pressure compressor 4, the high pressure compressor 6, the combustion chamber 7, the high pressure turbine 8 and the low pressure turbine 9 are surrounded by an inner fairing which extends from the inlet duct 2 to the low pressure turbine 9.

This inner fairing is surrounded by an outer fairing which delimits the turbine engine radially outwardly with respect to the longitudinal axis AX. The outer fairing radially outwardly delimits the secondary stream 13, especially at the fan 3.

Figure 2:
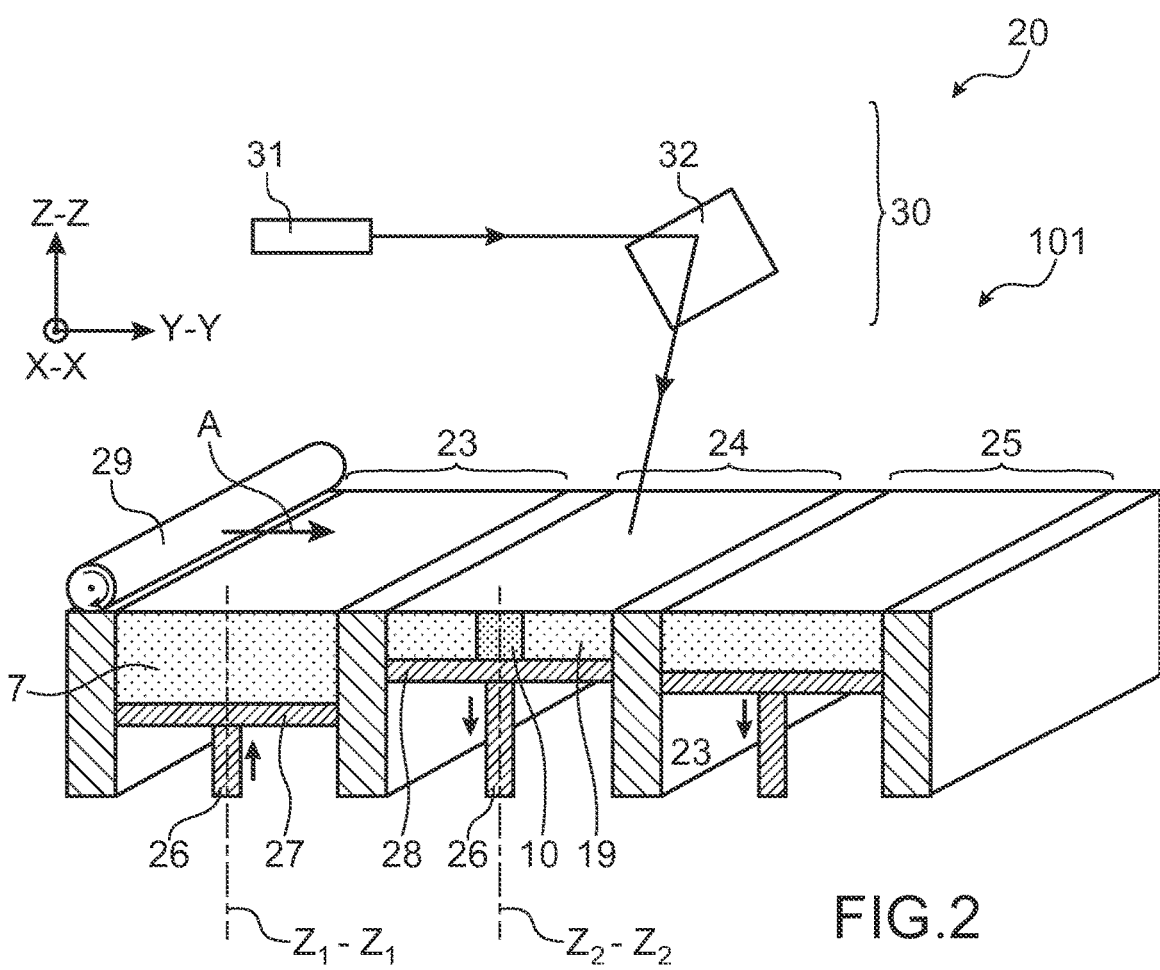
FIG. 2 is a partial schematic representation of additive manufacturing tooling which is used for the implementation of an additive manufacturing method according to the first embodiment of the invention.

FIG. 2 represents an exemplary tooling 20 for manufacturing a part by selective melting or selective sintering on a powder bed according to a manufacturing method according to a first embodiment.

In the embodiment represented, the part is a wall 10 for an aircraft turbine engine, for example a wall of a blade or a rim of a turbine engine. It is designed to withstand particularly high mechanical and/or thermal stresses during operation of the turbine engine. It is manufactured by additive manufacturing from a powder 17 which is typically made of a metallic material for aeronautical use.

The tooling 20 includes a powder 17 supply tank 23, a manufacturing tank 24, in which the wall blank 10 will be formed, and a third tank, which may be a recovery tank 25 for surplus powder 17 or a second supply tank.

The bottom of each tank is formed by a plate which is translationally movable on an actuating arm 26 oriented along a vertical axis of the tanks. Each plate comprises a metal sheet which forms a base for the powder 17. The plate 27 of the supply tank is configured to move along a first vertical axis Z1-Z1 which is substantially parallel to the second vertical axis Z2-Z2 of displacement of the manufacturing plate 28.

Actuation of the plate 27 of the supply tank allows powder 17 to be fed into the manufacturing plate 24. The manufacturing plate 28 of the manufacturing tank, as it lowers, allows the creation of successive layers 19 of the wall blank 10.

The tooling 20 also includes a spreading means 29, of the roller type as that represented in FIG. 1 or a scraper, which allows the powder 17 to be pushed from the supply tank 23 into the manufacturing plate 24 and to spread this powder 17, in the supply tank 23, so as to form a powder layer 19 having a determined thickness. To do this, the spreading means 29 moves along a horizontal scanning plane in a direction of displacement represented by arrow A from the supply tank 23 to the recovery tank 25. Excess powder can be recovered in the collection plate 25.

The tooling 20 further comprises a heating means 30 configured to melt or sinter at least part of a powder layer 19 deposited onto the manufacturing plate 28, so as to obtain, after solidification, a layer 19 of the wall blank 10.

The heating means 30 comprises, for example, a laser 31 and one or more mirrors 32 for sending the laser beam towards zones of the powder layer 17 to be molten or sintered. The manufacturing tank 24 will thus contain, after the powder layer 17 has been scanned by an energy beam, the layer 19 of solidified material which is surrounded by the powder 17 non-molten or unsintered.

The tooling 20 also includes a second heating means, for example an oven 34, for performing at least one heat treatment of the wall blank 10, following cooling of each layer 19 of solidified material.

Figure 3:
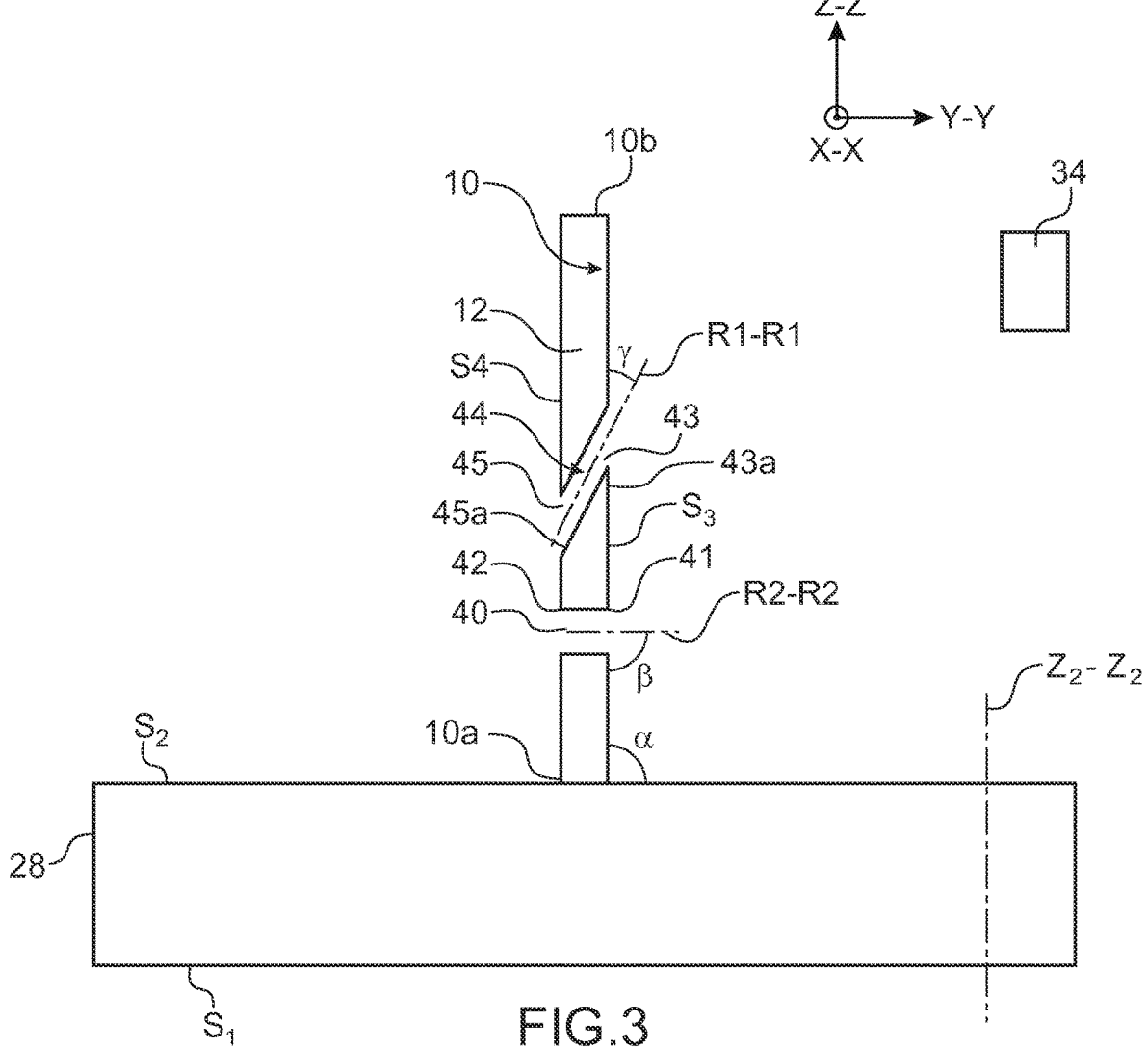
FIG. 3 schematically illustrates manufacturing of the wall on the additive manufacturing tooling, when implementing the additive manufacturing method according to the first embodiment.

With reference to FIG. 3, the manufacturing plate 28 comprises a lower external surface S1 and an upper external surface S2 which is opposite to the lower external surface S1 and to which the wall blank 10 is attached, following an additive manufacturing step 105 for the wall blank 10.

The wall 10 comprises a lower end 10*a*, an upper end 10*b* which is opposite to the lower end 10*a*, and a body 12 which extends from the lower end 10*a* to the upper end 10*b*. It comprises a first flat which is delimited by a first side surface S3 and a second plate which is delimited by a second side surface S4 which is opposite to the first side surface S3.

In the embodiment represented, the wall 10 is generally sheet-shaped and the second side surface S4 is substantially parallel to the first side surface S3.

As used herein and unless otherwise specified, an axial or longitudinal direction is a direction parallel to the longitudinal axis Z-Z of the wall 10. The longitudinal axis Z-Z of the wall 10 is substantially vertically oriented in the embodiment represented. A radial or transverse direction is a direction orthogonal to the longitudinal axis Z-Z of the wall and intersecting this axis. A circumferential direction is defined as a direction locally orthogonal to a radial direction and to the direction of the longitudinal axis Z-Z of the wall. A Y-Y normal direction is a direction that is substantially orthogonal to the first side surface S3 or the second side surface S4.

During its additive manufacturing 105, the wall blank 10 is attached at its lower end 10a to the manufacturing plate 28. It extends substantially perpendicular to the upper external surface S2 of the manufacturing plate 28 with which it forms an angle α.

The wall 10 has first cooling apertures 40 and second cooling apertures 44 passing therethrough.

Each second cooling aperture 44 extends from an inlet 43 which opens through the first side surface S3 to an outlet 45 which opens through the second side surface S4 about a longitudinal axis R1-R1 of this second cooling aperture 44. The longitudinal axis R1-R1 of each second cooling aperture 44 is tilted with respect to the first side surface S3 and with respect to the second side surface S4 by an angle γ that is between 5° and 45° in at least one longitudinal sectional plane of the wall 10 that includes the normal Y-Y to the wall 10.

In the embodiment represented, the longitudinal axis R1-R1 of each second cooling aperture 44 is tilted with respect to the first side surface S3 and with respect to the second side surface S4 by an angle γ that is substantially equal to 20° in the longitudinal sectional plane that is represented in FIG. 3.

In the embodiment represented, the inlet 43 of each second cooling aperture 44 comprises a rounded part 43a. The outlet 45 of each second cooling aperture 44 comprises a rounded part 45a.

Each first cooling aperture 40 extends from an inlet 41 that opens through the first side surface S3 to an outlet 42 that opens through the second side surface S4 about a longitudinal axis R2-R2 of this first cooling aperture 40. The longitudinal axis R2-R2 of each first cooling aperture 40 is oriented at an angle β which is substantially perpendicular to the first side surface S3 and the second side surface S4 of the wall 10.

It is all the more difficult to make each of the first cooling apertures 40 by additive manufacturing as the wall 10 is additively manufactured being substantially perpendicular to the manufacturing plate 28, and as the longitudinal axis R2-R2 of each first cooling aperture 40 is substantially perpendicular to the first side surface S3 and the second side surface S4 of the wall 10. This is because the material of the wall 10 tends to move downwards during melting/agglomeration of powder 17 at the upper edge of each of the first cooling apertures 40. Furthermore, the first cooling apertures are all the more difficult to make as they have small dimensions, for example a radius r1 which is substantially equal to 0.25 mm and an area A1 which is approximately equal to 0.20 mm². The manufacturing method 100 for the wall 10 according to the invention aims at remedying at least partially these drawbacks, by modifying additive manufacturing parameters of the wall 10 around each first cooling aperture 40, and especially in proximity to the first cooling apertures 40.

With joint reference to FIGS. 3, 4b, 5b and 6, the wall 10 is additively manufactured with lower zones 19a and intermediate zones 19b. The body 12 of the wall is manufactured without an upper zone 19c, unlike a wall 10 that would be additively manufactured according to a method known in the art such as that schematically represented in FIG. 4a.

In the present disclosure, a lower zone 19a, also known as a "downskin", is a zone that is formed from at least one solidified powder layer 17 and is manufactured with an energy input per unit length Ea that is lower than that for manufacturing an intermediate zone 19b.

An intermediate zone 19b, also known as an "inskin", is especially a zone which is formed by at least one solidified powder layer 17. The intermediate zones 19b form most of the volume of the wall 10. Each intermediate zone 19b is especially formed with an energy input per unit length Eb that is standard for the manufacture of the wall 10.

An upper zone 19c, also known as an "upskin", is especially a zone that is formed of at least one solidified powder layer 17 and is manufactured with an energy input per unit length Ec that is substantially equal to that used to manufacture an intermediate zone 19b but with a double energy exposure relative to the intermediate zone 19b.

Each lower zone 19a of the wall 10, at least partially delimiting a first cooling aperture 40, has a total thickness ea which is between 0.06 and 0.22 mm. Each lower zone 19a especially has a total thickness ea that is substantially equal to 0.12 mm.

In the present disclosure, the thickness parameter ea of each lower zone 19a is also known as the "thickness of the downskin". This is the total thickness of the lower zone 19a in at least one longitudinal cross-section of the wall 10.

In the embodiment represented, the total thickness ea of the lower zone 19a corresponds to the thickness of five layers of agglomerated/molten powder 17 in the lower zone 19a.

Each lower zone 19a of the wall 10, at least partially delimiting a first cooling aperture 40, is manufactured with a minimum length La of the lower zone which is between 0.01 and 0.4 mm. Each lower zone 19a is especially manufactured with a minimum length parameter La that is substantially equal to 0.05 mm.

In the present disclosure, the minimum length parameter La of the lower zone is also known as "downskin minimum length". This is the minimum length of powder solidification so that the lower zone 19a can be formed. The downskin minimum length parameter La is to be compared to the actual displacement length of the laser. It is less than the actual displacement length of the laser in the lower zone 19a to enable manufacture of the lower zone 19a.

In the embodiment represented, the minimum length parameter La corresponds to the minimum length of a molten/agglomerated powder layer in the lower zone 19a in at least one longitudinal cross-section of the wall 10.

Each lower zone 19a is manufactured by a first energy input per unit length Ea to the powder bed 17 which is between 0.02 J/mm and 0.03 J/mm. Each lower zone 19a is manufactured by a first energy input per unit length Ea to the powder bed 17 which is preferably substantially equal to 0.0250 J/mm.

Each intermediate zone 19b is manufactured by a second supply of linear energy Eb to the powder bed 17 which is between 0.1300 J/mm and 0.1950 J/mm. Each intermediate zone 19b is manufactured by a second energy per unit length Eb to the powder bed 17 which is preferably substantially equal to 0.1625 J/mm.

More generally, the first energy input per unit length Ea is substantially 85% less than the second energy input per unit length Eb. The low value of the first energy input per unit length Ea compared to the second energy input per unit length Eb makes it possible, especially, to melt/agglomerate less powder 17 during the manufacture of a lower zone 19a than during the manufacture of an intermediate zone 19b. This results in a decrease in the manufacturing defects of each first cooling aperture 40 by increasing the volume of the lower zone 19a relative to the volume of the intermediate zone 19b.

Figure 4A:
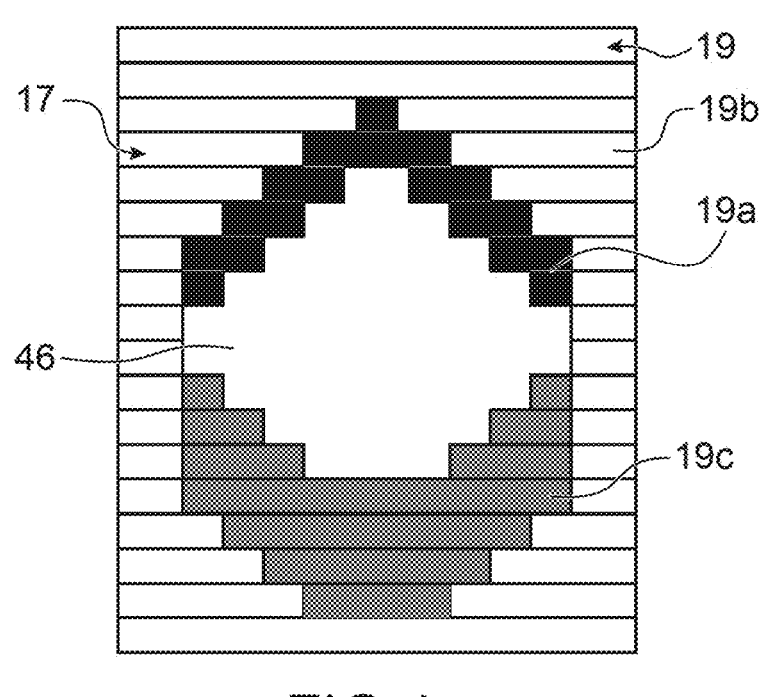
FIG. 4a schematically illustrates the structure of a wall in proximity to a cooling aperture, according to an additive manufacturing method known from the state of the art.
Figure 4B:
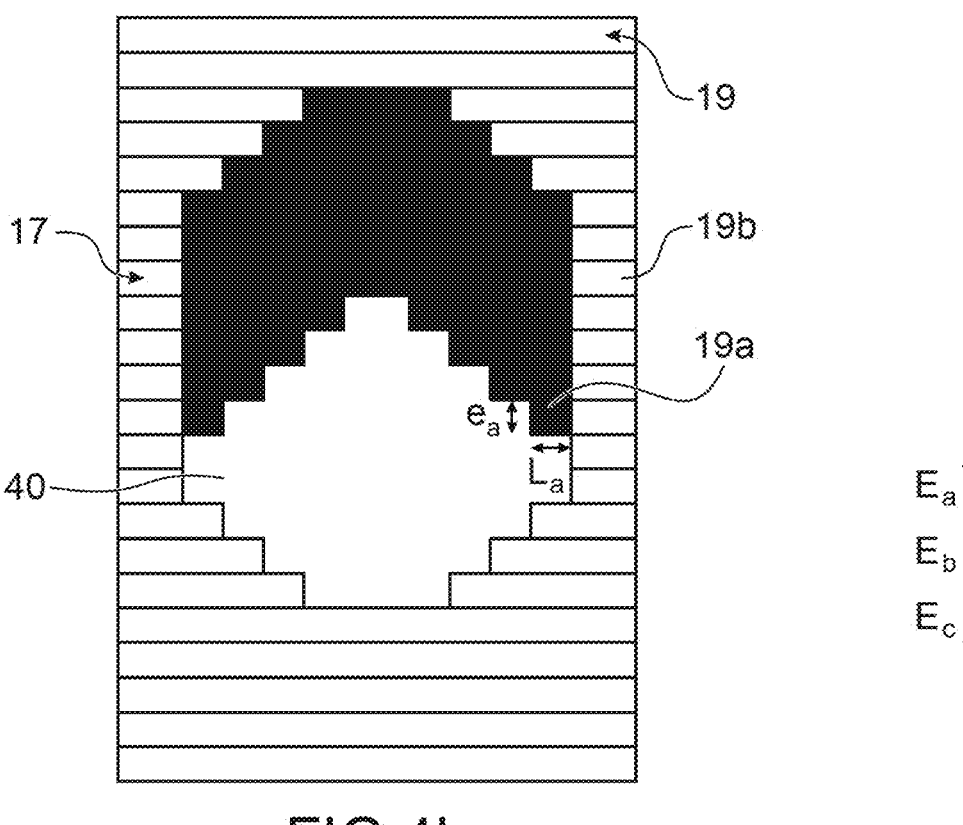
FIG. 4b schematically illustrates the structure of the wall in proximity to a cooling aperture, when using the additive manufacturing method according to the first embodiment.

With joint reference to FIGS. 4a and 4b, the wall 10 that is manufactured according to the additive manufacturing method 100 according to the first embodiment differs from a wall 10 that is additively manufactured according to a manufacturing method known from the state of the art, in that it is devoid of an upper zone 19c at the bottom of each first cooling aperture 40, in that it comprises a much greater volume of lower zone 19a which is located at the upper edge of each first cooling aperture 40, and in that each first cooling aperture 40 is delimited at its lower edge by an intermediate zone 19b.

The minimum length La of each lower zone 19a of the wall 10 that is manufactured according to the additive manufacturing method 100 according to the first embodiment is, for example, substantially 90% less than the minimum length of each lower zone 19a of a wall 10 that is additively manufactured according to a manufacturing method known from the state of the art. The minimum length La of each lower zone 19a of the wall is especially determined along the direction X-X with joint reference to FIGS. 3, 4a and 4b.

The thickness ea of all layers of the lower zone 19a of the wall 10 which is manufactured according to the additive manufacturing method 100 according to the first embodiment is, for example, 200% greater than the thickness of all layers of a lower zone 19a of a wall 10 which is additively manufactured according to a manufacturing method known from the state of the art. The total thickness ea of the lower zone 19a is especially determined along the direction Z-Z, with joint reference to FIGS. 3, 4a and 4b.

The manufacturing parameters of each intermediate zone 19b of the wall 10 that is manufactured according to the additive manufacturing method 100 are substantially identical to the manufacturing parameters of the intermediate zone 19b of a wall 10 that is additively manufactured according to a manufacturing method known from the state of the art.

As previously indicated, the wall 10 that is manufactured according to the additive manufacturing method 100 according to the first embodiment does not comprise upper zones 19c.

Figure 5A:
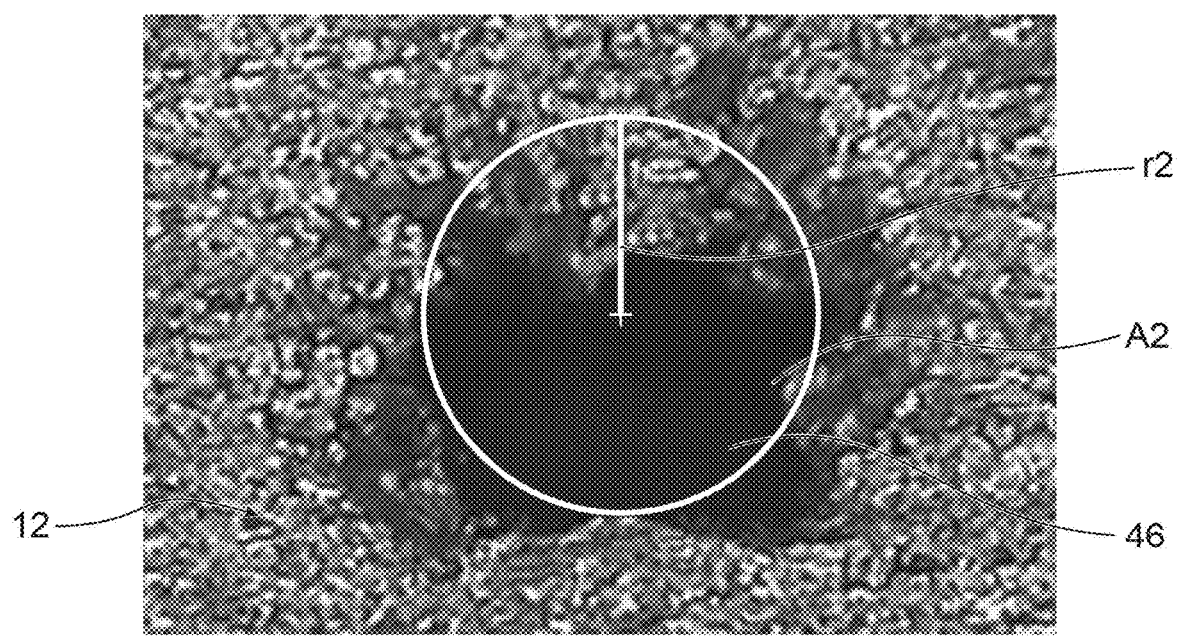
FIG. 5a is a photograph representing the wall including a cooling aperture, which is manufactured by the additive manufacturing method known from the state of the art.
Figure 5B:
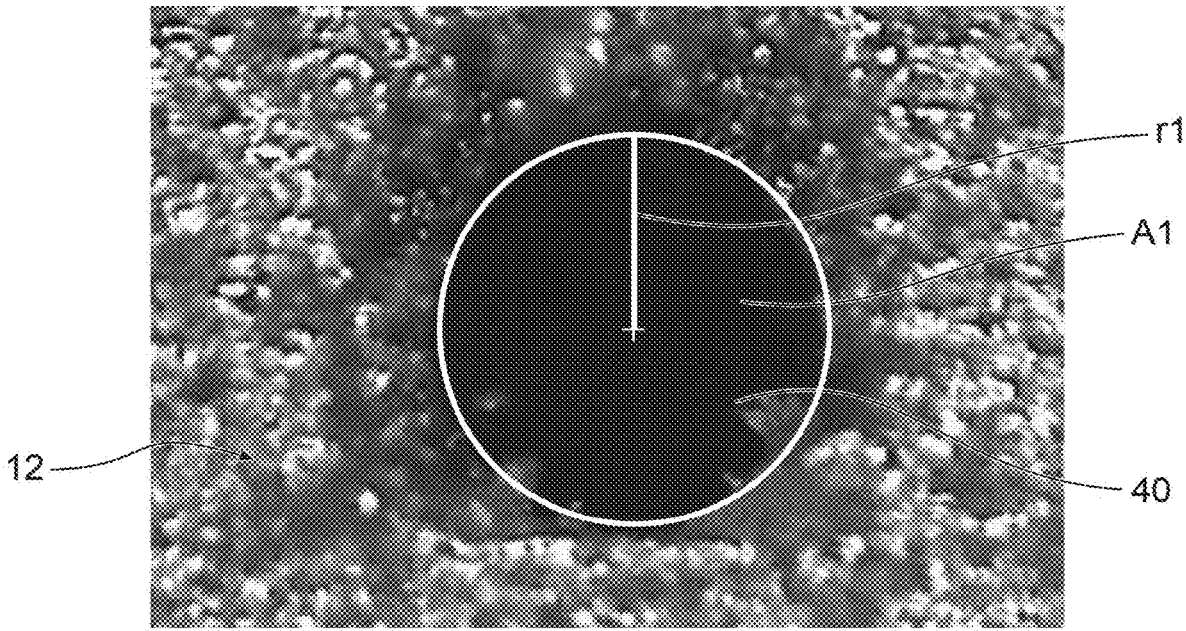
FIG. 5*b* is a photograph representing the wall including a cooling aperture, which is manufactured by the additive manufacturing method according to the first embodiment.

With joint reference to FIGS. 5a and 5b, the third cooling aperture 46 which is represented in FIG. 5a differs from the first cooling aperture 40 which is represented in FIG. 5b in its additive manufacturing method.

With reference to FIG. 4a, the third cooling aperture 46 only comprises two layers in the lower zone 19a which is located exclusively on an upper edge of the third cooling aperture 46. It comprises four layers in the upper zone 19c which is located exclusively in a lower edge of the third cooling aperture 46.

With reference to FIG. 5a, the third cooling aperture 46 which passes through a wall 10 which is manufactured according to a manufacturing method known from the state of the art, has an edge which has a rather irregular shape. It includes material collapses at its upper edge. Furthermore, it includes significant inappropriate material deposits at the bottom of the third cooling aperture 46. The third cooling aperture 46 comprises, for example, a radius r2 which is substantially equal to 0.25 mm and a surface area A2 which is approximately equal to 0.19 mm².

With reference to FIG. 4b, the upper edge of the first cooling aperture 40 comprises five layers of agglomerated/molten powder in the lower zone 19a which is located exclusively on an upper edge of the first cooling aperture 40. The total thickness ea of the lower zone 19a of the first cooling aperture 40 is significantly higher than that of the lower zone 19a of the third cooling aperture 46, due to the higher number of layers of the lower zone 19a of the first cooling aperture 40. The lower edge of the first cooling aperture is formed by an intermediate zone 19b. The edge of the first cooling aperture 40 is free of upper zone 19c, unlike the third cooling aperture 46.

The minimum length La of each layer of the lower zone 19a of the wall 10 around each first cooling aperture 40 of the embodiment in FIG. 4b is less, along the horizontal direction of FIGS. 4a and 4b, than the minimum length of each layer of the lower zone 19a of the embodiment of FIG. 4a.

With reference to FIG. 5b, the first cooling aperture 40 which is manufactured according to a manufacturing method 100 according to the first embodiment, has a more regular shape, especially at its upper edge and at the bottom of the first cooling aperture 40. The radius r1 of the first cooling aperture 40 is substantially equal to r2 of the third cooling aperture 46. The surface area A1 of the first cooling aperture is about 15% larger than the surface area A2 of the third cooling aperture 46, due to the more regular edge of the first cooling aperture 40.

Figure 6:
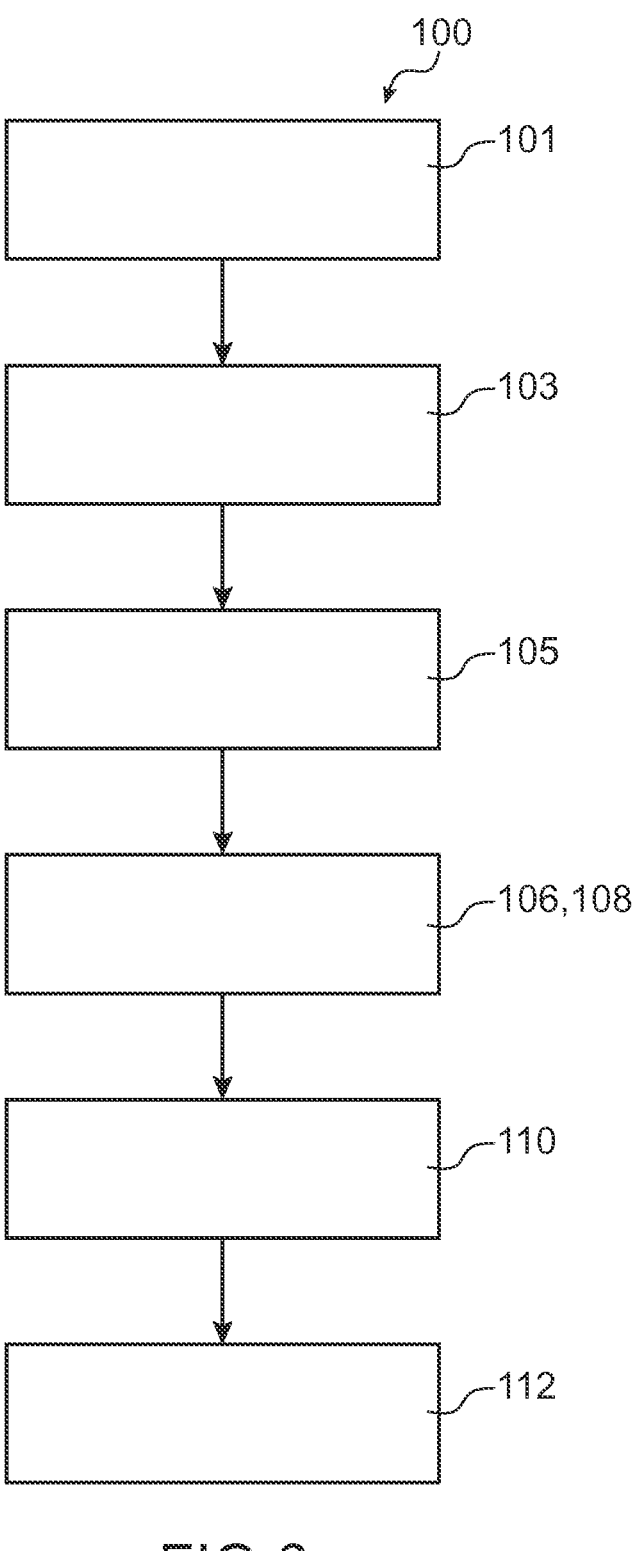
FIG. 6 schematically illustrates the implementation of the additive manufacturing method according to the first embodiment of the invention.

The additive manufacturing method 100 according to the first embodiment is now described in more detail, especially with reference to FIG. 6.

The manufacturing method 100 firstly comprises a step 101 of determining the additive manufacturing parameters of the wall 10, especially the value of the minimum length La of each lower zone 19a, the value of the thickness parameter ea of all the layers of the lower zone 19a, the value of the first energy input per unit length Ea and the value of the second energy input per unit length Eb.

The additive manufacturing method 100 then comprises digitally modelling 103 each first cooling aperture 40 with a substantially oval transverse surface so that each first cooling aperture 40 is manufactured with a substantially circular transverse cross-section.

This digital modelling 103 of each first cooling aperture 40 with a surface shape different from the intended shape for this aperture especially allows for downward material displacement upon melting/agglomerating the powder 17 at the upper edge of each first cooling aperture 40.

The manufacturing method 100 continues with a step of additively manufacturing 105 layer by layer the wall 10 by selective melting or selective sintering on a powder bed 17, especially by a laser. The first cooling apertures 40 and the second cooling apertures 44 are made through the wall 10 simultaneously with the manufacture of the wall 10.

The energy beam that is applied to the powder bed 17 to form each lower zone 19a and each intermediate zone 19b is linearly moved back and forth. Following the additive manufacturing step 105, the wall blank 10 is attached at its lower end 10a to the manufacturing plate 28.

The additive manufacturing method 100 according to the first embodiment makes it possible, especially, to make each second cooling aperture 44 with an orientation with respect to each of the side surfaces S3, S4 that would be difficult to achieve with a drilling method known from the state of the art, such as laser drilling, especially when the angle γ is less than or equal to 20°.

The rounded part 43*a* at the inlet of each second cooling aperture 44 tends to limit undesirable material deposits at the inlet 43 of each second cooling aperture 44 during additive manufacturing 105. The rounded part 45*a* at the outlet of each second cooling aperture 44 tends to limit unwanted material deposits at the outlet 45 of each second cooling aperture 44 during additive manufacturing 105.

The additive manufacturing step 105 comprises rapid cooling of the wall blank 10, following melting or sintering of the powder 17, which is likely to generate mechanical stresses, especially shrinkage, as well as structural variations in the wall blank 10.

The manufacturing method 100 comprises heating 106, 108 the wall blank 10. This heating 106 especially comprises a first stress relieving heat treatment that aims at reducing thermal stresses, residual mechanical stresses and structural variations that were generated in the wall blank 10 during the additive manufacturing step 105. This heating 106, 108 may also include a second heat treatment 108 to increase robustness and/or life time of the wall blank 10. The heating 106, 108 typically takes place at a temperature above 1000° C.

Finally, the method 100 for manufacturing the wall 10 includes machining 110 the wall blank 10, especially to separate the lower end 10*a* of the wall blank 10 from the manufacturing plate 28. This machining 110 comprises, for example, electroerosive machining the wall 10.

The manufacturing method 100 may also include machining 112 the manufacturing plate 28. This machining 112 comprises, for example, electroerosive machining, grinding, or sandblasting the manufacturing plate 28 for the purpose of manufacturing a further wall 10.

By virtue of the additive manufacturing method 100 according to the invention, the manufacture of the turbine engine wall 10 with at least a first cooling aperture 40 of small dimensions is facilitated. The geometry of each first cooling aperture is especially improved. The additive manufacturing method 100 according to the invention makes it possible especially to produce first cooling apertures 40 with a smaller radius r1.

The manufacturing method 100 of the wall 10 tends to be more reproducible. It also promotes making the first cooling apertures 40 which have more uniform geometries in the wall 10.

In particular, the minimum length La of each lower zone 19*a* is lowered during the manufacturing method 100 and the thickness of each lower zone 19*a* is increased. The wall 10 is then manufactured with lower zones 19*a* over a larger volume relative to the volume of the intermediate zones 19*b*, especially in the absence of an upper zone 19*c*, in proximity to each of the first cooling apertures 40. This results in a more accurate, uniform and more easily reproducible geometry of each first cooling aperture 40, especially a decrease in manufacturing defects of each first cooling aperture 40.

In the absence of an upper zone 19*c*, manufacturing defects of each first cooling aperture 40 are reduced. In particular, inappropriate material deposits at the bottom of each first cooling aperture 40 in the absence of upper zones 19*c* are limited.

Figure 7:
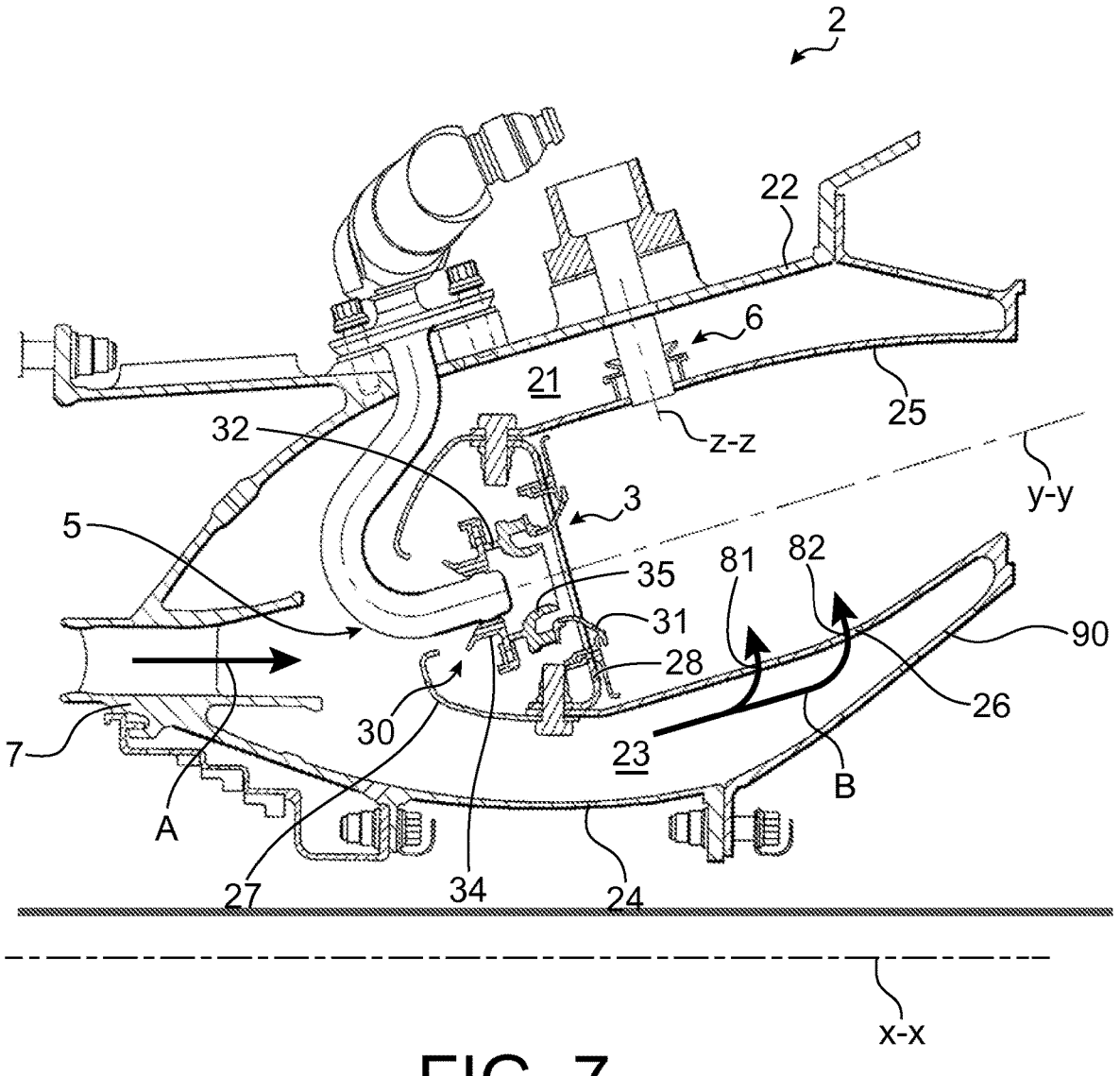
FIG. 7 is a partial schematic representation in a longitudinal half cross-section view of a turbine engine combustion chamber, according to one embodiment of the invention.

FIG. 7 schematically represents a combustion chamber 2 of an aircraft turbine engine. The combustion chamber 2 is annular about a longitudinal axis X-X of the turbine engine.

It includes an external casing wall 22 and an internal casing wall 24, a fairing 27, an outer wall 25 and an inner wall 26 which are joined by a chamber bottom 28.

The outer wall 25, the inner wall 26, the fairing 27 and the chamber bottom 28 together delimit a flame tube of the combustion chamber, within which the combustion of the combustion chamber 2 takes place.

The combustion chamber 2 also comprises at least one spark plug 6, injectors 5, injection systems 3 and a diffuser 7.

The external casing wall 22 delimits the combustion chamber 2 radially outwardly with respect to the longitudinal axis X-X of the turbine engine. The internal casing wall 24 delimits the combustion chamber 2 radially inwardly with respect to the longitudinal axis X-X of the turbine engine. It is mechanically connected to an internal shell for attaching the inner wall 26.

The external casing wall 22 delimits a first air flow passage 21 together with the outer wall 25. Similarly, the internal casing wall 24 defines a second air flow passage 23 together with the chamber inner wall 26.

Throughout the disclosure, a longitudinal or axial direction is a direction that is substantially parallel to the longitudinal axis X-X of the turbine engine. A radial direction is a direction that is substantially orthogonal to and intersects the longitudinal axis X-X of the turbine engine. A circumferential direction is a direction about the longitudinal axis X-X of the turbine engine.

An "upstream" direction and the "downstream" direction are defined by the general direction of flow of air and fuel in the combustion chamber 2. This direction also substantially corresponds to the general direction of flow of the exhaust gases in the turbine engine.

Generally speaking, the term "air" refers to any gas that may serve as an oxidant in the combustion chamber 2 of the turbine engine.

The outer wall 25 and the inner wall 26 are walls of revolution which are coaxial about the turbine engine longitudinal axis X-X, being symmetrical with respect to a longitudinal axis Y-Y of the injection system 3 which is represented in FIG. 7. They may each extend 360° about the turbine engine longitudinal axis X-X or be angularly segmented.

The outer wall 25 and the inner wall 26 each comprise primary apertures 81 for introducing a primary air flux into the flame tube and dilution apertures 82 for introducing a dilution air flux into the flame tube. Each will be described in detail below.

The fairing 27 extends from the outer wall 25 and the inner wall 26 upstream being located upstream of the chamber bottom 28. It includes central openings for housing the corresponding injection systems 3 and injectors 5.

The chamber bottom 28 includes openings for mounting the injection systems 3 in which the fuel injectors 5 are engaged.

Each spark plug 6 is mounted through the outer wall 25 of the combustion chamber. It extends transversely to this wall by having its longitudinal axis Z-Z which is substantially orthogonal to the longitudinal axis Y-Y of the injection system 3 of the injector 5 represented which is located in proximity to the spark plug 6.

The spark plug 6 serves to ignite the air-fuel mixture sheet in the combustion chamber 2, so that the flame then spreads to the neighbouring air-fuel mixture sheets, to ignite the combustion chamber 2.

The injection systems 3 are mounted to the chamber bottom 28 by being spaced apart along a circumferential direction.

Each injection system 3 comprises from upstream to downstream a sliding feedthrough 34, a spinner 32, a venturi 35, and a mixing bowl 31. The sliding feedthrough 34, the spinner 32 and the mixing bowl 31 together form air supply means 30 for producing a fuel-air mixture sheet with the fuel injected by the corresponding injector 5.

Each injection system 3 is connected to one of the fuel injectors 5 which is mounted in the sliding feedthrough 34 at an injector nose. The sliding feedthrough 34 may include air supply holes.

The spinner 32 is mounted integral with the mixing bowl 31. It generally includes a first stage of vanes and a second stage of vanes, the function of which is to rotationally drive air about the axis Y-Y of the injection system 3. The vanes of the first vane stage of the spinner 32 may rotate in the same direction or in the opposite direction to those of the second vane stage of the spinner 32.

The mixing bowl 31 has a flared shape substantially of revolution about the longitudinal axis Y-Y of the injection system 3. It comprises through holes for supplying the combustion chamber 2 with air. It is attached to the chamber bottom 28.

The diffuser 7 is configured to supply the combustion chamber 2, especially the injection systems 3, the primary apertures 81 and the dilution apertures 82, with hot pressurised air along arrow A.

This pressurised air serves especially for the combustion or cooling of the combustion chamber 2. Part of this air is introduced into the combustion chamber 2 at the central opening of the fairing 27, while another part of the air flows to the air flow passages 21 and 23. The air supplied to the injection system 3 flows from the central opening of the fairing 27, especially through the vanes of the injection system 32 represented in FIG. 7 and the through holes of the mixing bowl 31. The air flow depicted by the arrows B in the passages 21 and 23 enters the combustion chamber 2 through the primary apertures 81 and the dilution apertures 82.

With joint reference to FIGS. 8 to 12, the outer wall 25 comprises a first upstream attachment rim 70, a first partition 40, a second partition 42, a cooling duct 41 which is located between the first partition 40 and the second partition 42, stiffeners 44, and a support 29 for each spark plug 6. The outer wall 25 delimits the flame tube of the combustion chamber 2 radially outwardly.

Each spark plug support 29 is configured to guide and support the corresponding spark plug 6 in the flame tube through the outer wall 25. In the embodiment represented, each spark plug support 29 is made as one piece with the outer wall 25.

The first upstream attachment rim 70 comprises a first upstream attachment edge 71 and a second upstream attachment edge 73. It is configured to attach the outer wall 25 to the fairing 27 and/or the chamber bottom 28.

The first upstream attachment edge 71 is located radially inwardly of the second upstream attachment edge 73. It extends substantially along the entire circumferential length of the outer wall 25. The first upstream attachment edge 71 is tilted relative to the first inlet wall 46 of the first cooling duct 41.

The first upstream attachment edge 71 has at least one first aperture 83 extending therethrough, which has a radial component and is located axially in proximity to the first air inlet 45 of the first cooling duct 41. Each first aperture 83 serves to introduce air into the flame tube and/or to cool the first upstream attachment edge 71, especially by film. The first upstream attachment edge 71 tends to increase the amount of air introduced into the flame tube of the combustion chamber 2, while aiding in connecting the outer wall to the chamber bottom 28 and/or the fairing 27.

In the embodiment represented, the first upstream attachment edge 71 has two rows of first apertures 83 passing therethrough, each extending substantially along the entire circumferential length of the first upstream attachment edge 71.

The second upstream attachment edge 73 is parallel to the first upstream attachment edge 71. It extends substantially along the entire circumferential length of the outer wall 25. The second upstream attachment edge 73 is tilted relative to a first inlet wall 46 of the first cooling duct 41 to form a generally V-shaped opening that flares upstream.

The second upstream attachment edge 73 is designed to direct cooling air in conjunction with the first inlet wall 46 towards the first air inlet 45 of the first cooling duct 41, while allowing the outer wall 25 to be secured to the fairing 27 and/or chamber bottom 28 with the first upstream attachment edge 71. The second upstream attachment edge 73 tends to increase the amount of air circulating through the first cooling duct 41.

Figure 8:
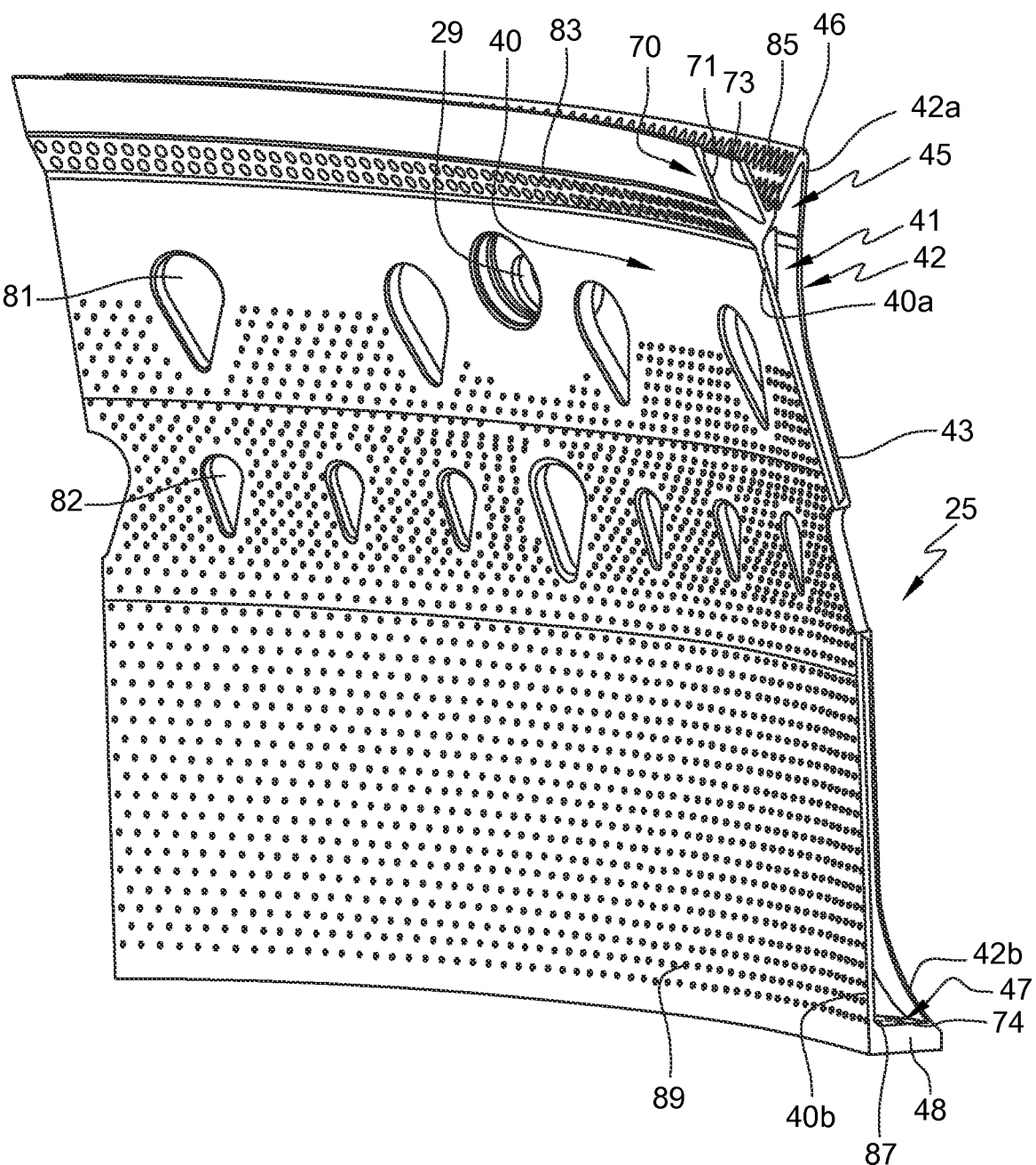
FIG. 8 is a partial schematic representation in a perspective view of an outer wall of the combustion chamber according to the first embodiment from the inner side of the outer wall.
Figure 9:
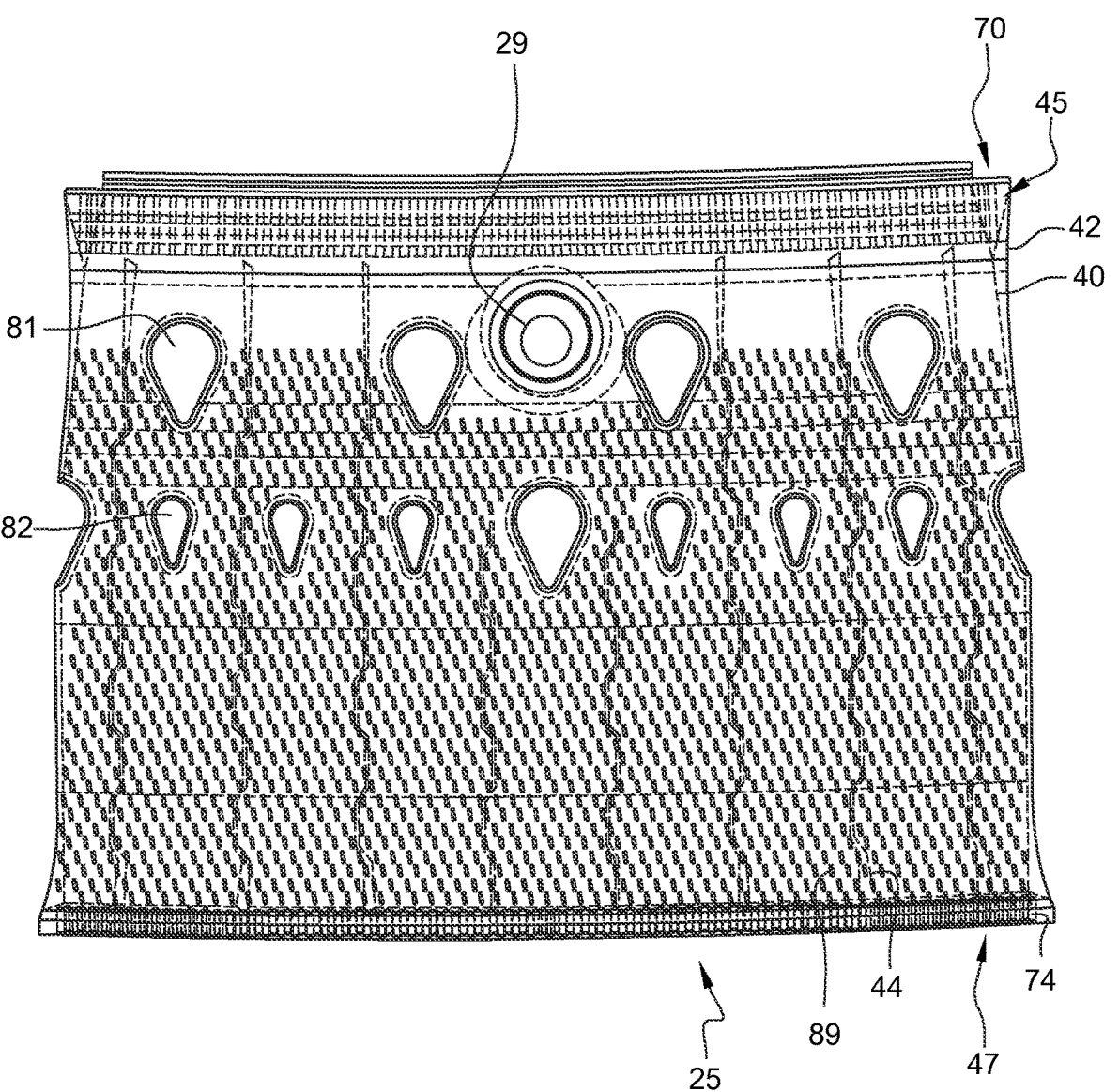
FIG. 9 is a partial schematic representation of the outer wall of the combustion chamber according to the first embodiment from the outer face of the outer wall.

With reference more specifically to FIGS. 8 and 9, each of the stiffeners 44 of the outer wall 25 extends radially from the first partition 40 to the second partition 42. Some of the stiffeners 44 extend axially from, for example, the first inlet wall 46 to the first outlet wall 48 of the first cooling duct 41. Others of the stiffeners 44 extend axially from the dilution apertures 82 to the first outlet wall 48.

The stiffeners 44 serve to increase the mechanical strength of the outer wall 25. Because of the stiffeners 44, the outer wall 25 may have a satisfactory mechanical strength compared to a solid outer wall despite the first partition 40, the second partition 42 and the first cooling duct 41.

With joint reference to FIGS. 8 to 12, the first partition 40 of the outer wall is an inner partition of the outer wall 25. It delimits the outer wall 25 radially inwardly. It extends axially from an upstream end 40a to a downstream end 40b. It is connected at the upstream end 40a to the first upstream attachment edge 71 and to the first inlet wall 46. It is connected at the downstream end 40b to the first outlet wall 48. It extends along substantially the entire circumferential length of the outer wall 25.

The first partition 40 has at least one second aperture 89 passing therethrough, which has a radial component and is located axially between a primary aperture 81 and the downstream end 40b. Each second aperture 89 serves to introduce air into the flame tube and/or to cool the first partition 40, especially by a film.

In the embodiment represented, the first partition 40 is substantially equidistant from the longitudinal axis X-X of the turbine engine from its upstream end 40a to its downstream end 40b. The first partition 40 has a plurality of second apertures 89 passing therethrough, which extend axially from the primary apertures 81 to the downstream end 40b and by being substantially uniformly distributed. The second apertures 89 extend along substantially the entire circumferential length of the first partition 40.

The first partition 40 has a thickness which is substantially constant from its upstream end 40a to its downstream end 40b. The thickness of the first partition 40 is for example between 35% and 55% of the thickness of the outer wall 25.

The second partition 42 of the outer wall 25 is an outer partition of the outer wall 25. It delimits especially the outer wall 25 radially outwardly. The second partition 42 is radially spaced from the first partition 40 to form the first cooling duct 41 with the first partition 40.

The second partition 42 axially extends from an upstream end 42a to a downstream end 42b. It is connected at the upstream end 42a to the first inlet wall 46. It is connected at the downstream end 42b to the first outlet wall 48. It extends along substantially the entire circumferential length of the outer wall 25.

The second partition 42 is free of cooling holes in the embodiment represented. It has only the support 29 of the spark plug 6, the primary apertures 81 and the dilution apertures 82 passing therethrough.

In the embodiment represented, the second partition 42 approaches the longitudinal axis X-X of the turbine engine from its upstream end 42a to an intermediate portion 43 of the second partition 42 which is located strictly between the upstream end 42a and the downstream end 42b. The intermediate portion 43 is especially located axially substantially equidistant from the upstream end 42a and the downstream end 42b. The second partition 42 extends away from the longitudinal axis X-X of the turbine engine from the intermediate portion 43 to its downstream end 42b.

The second partition 42 has a thickness that is substantially constant from its upstream end 42a to its downstream end 42b. The thickness of the second partition 42 is for example between 12% and 35% of the thickness of the outer wall 25.

The first cooling duct 41 comprises a first air inlet 45 and a first air outlet 47. It is radially inwardly delimited by the first partition 40. It is radially outwardly delimited by the second partition 42. It is delimited upstream by the upstream end 40a of the first partition 40, by the upstream end 42a of the second partition 42 and by a first inlet wall 46. It is delimited downstream by the downstream end 40b of the first partition 40, by the downstream end 42b of the second partition 42 and by a first outlet wall 48. The first cooling duct 41 is configured to cool the outer wall 25, especially by a film through the second apertures 89, as well as by contact of the cooling air with the first partition 40 and with the second partition 42.

The radial extent of the first cooling duct 41 narrows downstream from the first inlet wall 46 to the intermediate portion 43 of the second partition 42. The ratio of the radial extent e2 at the intermediate portion 43 to the radial extent e1 at the first inlet wall 46 is for example between 10% and 30%.

The radial extent of the first cooling duct 41 increases downstream from the intermediate portion 43 to the first outlet wall 48. The ratio of the radial extent e2 at the intermediate portion 43 to the radial extent e3 at the first outlet wall 48 is for example between 20% and 40%.

The first air inlet 45 comprises the first inlet wall 46. The first inlet wall 46 extends from the first partition 40 to the second partition 42. The first inlet wall 46 is tilted with respect to the radial direction upstream towards the second partition 42. It is mechanically connected to the first upstream attachment edge 71 and the second upstream attachment edge 73 in proximity to the upstream end 40a of the first partition 40. The first inlet wall 46 extends along substantially the entire circumferential length of the outer wall 25.

The first inlet wall 46 is configured to partially seal the first cooling duct 41 upstream, regulating the air velocity and pressure at the first inlet 45.

The first inlet wall 46 has at least one first inlet aperture 85 passing therethrough, which has an axial component. Each first inlet aperture 85 serves to introduce air substantially axially into the first cooling duct 41 through the first inlet wall 46.

In the embodiment represented, the first inlet wall 46 has two rows of first inlet apertures 85 passing therethrough, which extend through each of them along substantially the entire circumferential length of the first inlet wall 46 and which are radially spaced from each other. Each of the first inlet apertures 85 is oriented substantially axially along the longitudinal axis X-X of the turbine engine.

The first outlet 47 comprises the first outlet wall 48. The first outlet wall 48 extends from the first partition 40 to the second partition 42. It is oriented substantially radially serving as a planar support for a flange for attachment to a turbine wall to which it is to be connected. The first outlet wall 48 extends along substantially the entire circumferential length of the outer wall 25.

The first outlet wall 48 is configured to partially seal the first cooling duct 41 in a downstream direction, by regulating the air velocity and pressure at the first outlet 47. It is configured to mechanically connect the outer wall 25 to the turbine wall mounting flange.

The first outlet wall 48 has at least one first outlet aperture 87 passing therethrough, which has an axial component. Each first outlet aperture 87 serves to discharge air substantially axially into the first cooling duct 41 through the first outlet wall 48. The first outlet wall 48 has at least one first attachment aperture 74 passing therethrough from the outer wall 25 to a turbine wall of the turbine engine, for example a high pressure turbine wall of the turbine engine. Each attachment aperture 74 is to receive an attachment member such as a screw of a nut for fastening the outer wall 25 to the turbine wall.

In the embodiment represented, the first outlet wall 48 has a row of first outlet apertures 87 passing therethrough along substantially the entire circumferential length of the first outlet wall 48. Each of the first outlet apertures 87 is oriented substantially axially along the longitudinal axis X-X of the turbine engine. The first outlet wall 48 has a row of first attachment apertures 74 passing therethrough, which extends along substantially the entire circumferential length of the first outlet wall 48 and which is radially spaced from the row of first outlet apertures 87.

Figure 10:
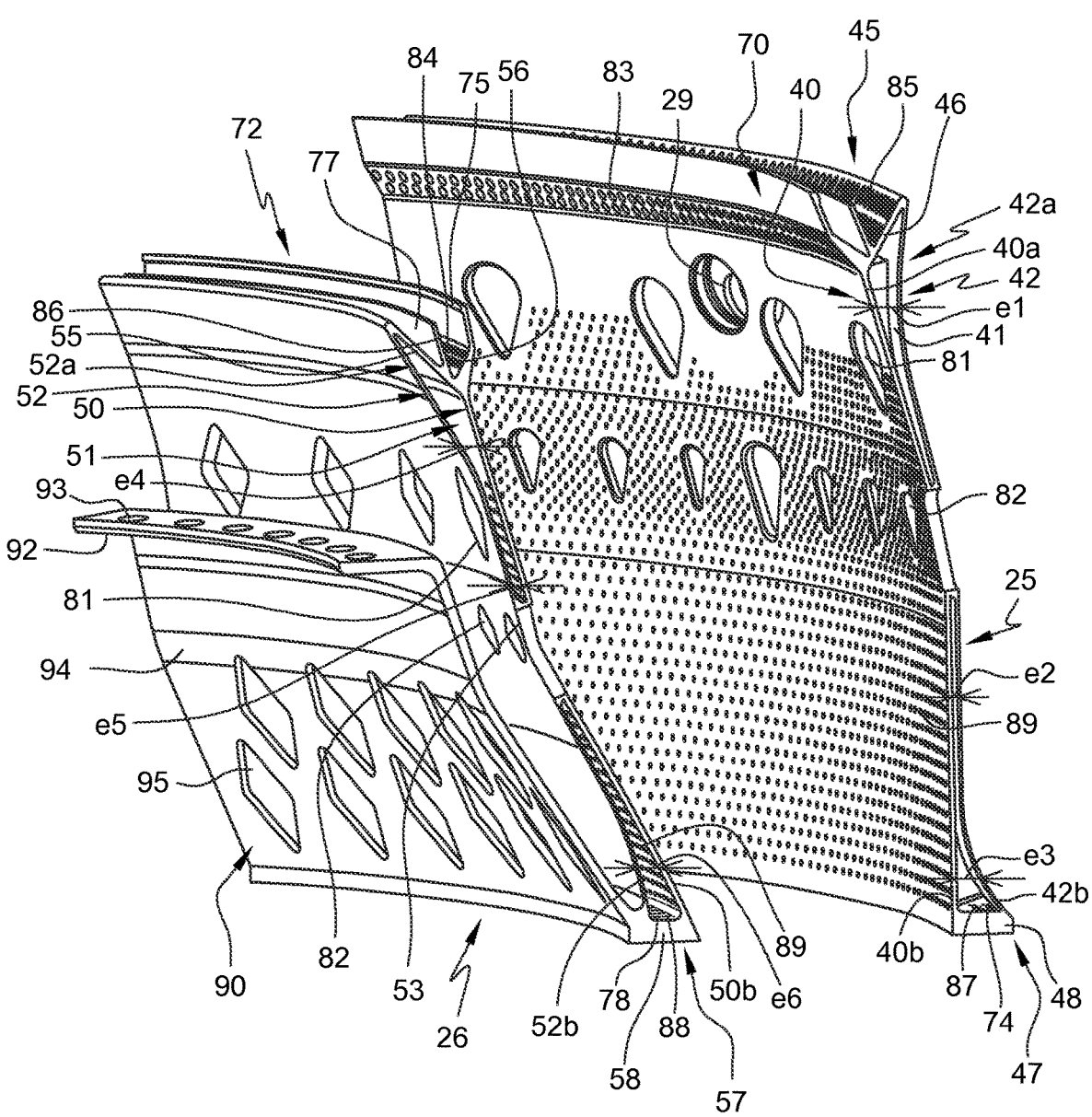
FIG. 10 is a partial schematic representation in a perspective view of the outer wall and the inner wall of the combustion chamber according to the first embodiment.
Figure 11:
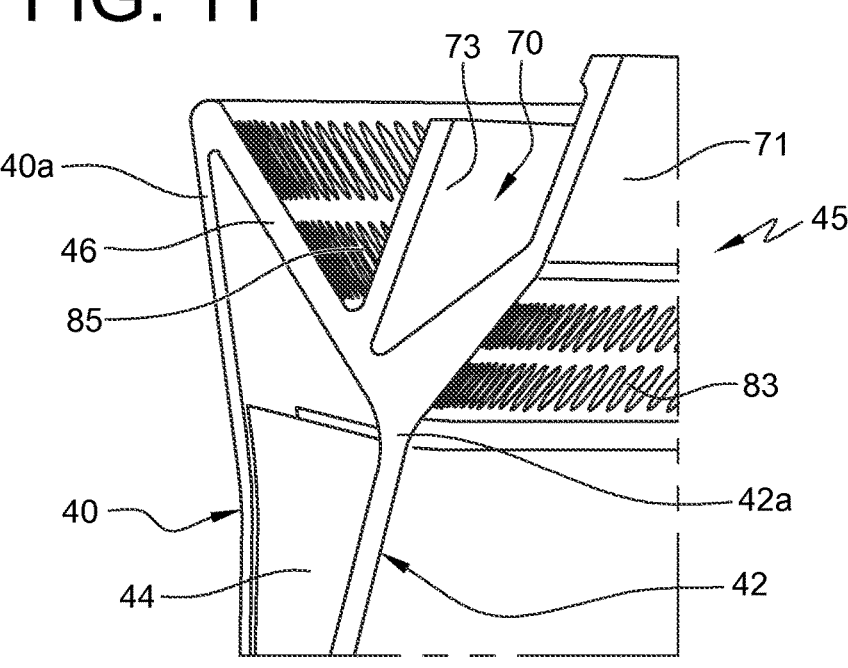
FIG. 11 is a partial schematic representation of an upstream end of the outer wall of the combustion chamber according to the first embodiment.
Figure 12:
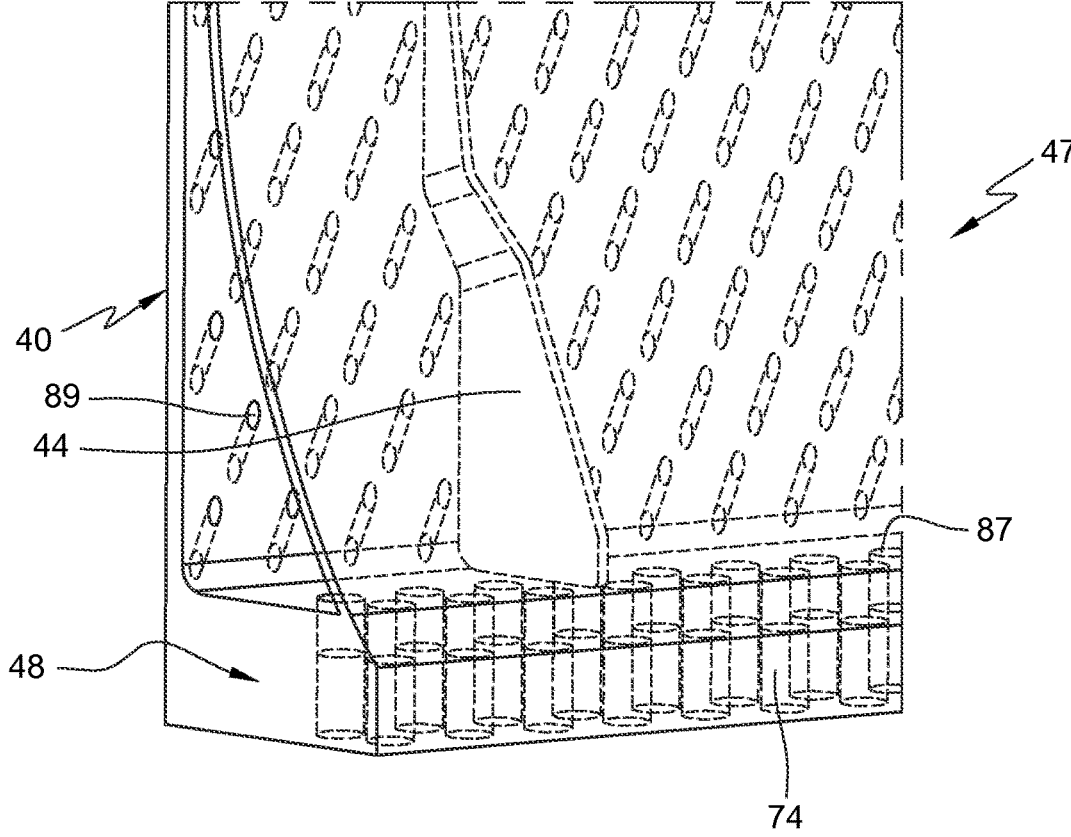
FIG. 12 is a partial schematic representation of a downstream end of the outer wall of the combustion chamber according to the first embodiment.

With reference to FIG. 10, the inner wall 26 comprises a second upstream attachment rim 72, a third partition 50, a fourth partition 52, a second cooling duct 51 which is located between the third partition 50 and the fourth partition 52, stiffeners (not represented) and an inner attachment ferrule 90. The inner wall 26 delimits the flame tube of the combustion chamber 2 radially inwardly.

The second upstream attachment rim 72 comprises a third upstream attachment edge 75 and a fourth upstream attachment edge 77. It is configured to attach the inner wall 26 to the fairing 27 and/or the chamber bottom 28.

The third upstream attachment edge 75 is located radially inwardly of the fourth upstream attachment edge 77. It extends substantially along the entire circumferential length of the inner wall 26. The third upstream attachment edge 75 is tilted relative to the second inlet wall 56 of the second cooling duct 51.

The third upstream attachment edge 75 has at least one third aperture 84 passing therethrough which has a radial component and is located axially in proximity to the second air inlet 55 of the second cooling duct 51. The third upstream attachment edge 75 tends to increase the amount of air introduced into the flame tube of the combustion chamber 2, while aiding in connecting the inner wall 26 to the chamber bottom 28 and/or the fairing 27.

Each third aperture 84 serves to introduce air into the flame tube and/or to cool the third upstream attachment edge 75, especially by a film.

In the embodiment represented, the third upstream attachment edge 75 has two rows of third apertures 84 passing therethrough, each extending along substantially the entire circumferential length of the third upstream attachment edge 75.

The fourth upstream attachment edge 77 is parallel to the third upstream attachment edge 75. It extends substantially on the entire circumferential length of the inner wall 26. The fourth upstream attachment edge 77 is tilted relative to a second inlet wall 56 of the second cooling duct 51 to form a generally V-shaped opening which flares upstream.

It is designed to direct cooling air in conjunction with the second inlet wall 56 towards the second air inlet 55 of the second cooling duct 51, while allowing the inner wall 26 to be secured to the fairing 27 and/or chamber bottom 28 with the third upstream attachment edge 75. The fourth upstream attachment edge 77 tends to increase the amount of air that circulates through the second cooling duct 51.

Each of the stiffeners of the inner wall 26 extends radially from the third partition 50 to the fourth partition 52. Some of the stiffeners extend axially from, for example, the second inlet wall 56 to the second outlet wall 58 of the second cooling duct 51. Others of the stiffeners extend axially from the dilution apertures 82 to the second outlet wall 58.

The stiffeners serve to increase mechanical strength of the inner wall 26. As a result of the stiffeners, the inner wall 26 can have a satisfactory mechanical strength compared to a solid inner wall despite the third partition 50, the fourth partition 52 and the second cooling duct 51.

The third partition 50 of the inner wall 26 is an outer partition of the inner wall 26. It delimits the inner wall 26 radially outwardly. It extends axially from an upstream end 50a to a downstream end 50b. It is connected at the upstream end 50a to the third upstream attachment edge 75 and to the second inlet wall 56. It is connected at the downstream end 50b to the second outlet wall 58. It extends along substantially the entire circumferential length of the inner wall 26.

The third wall 50 has at least one second aperture 89 passing therethrough, which has a radial component and is located axially between a primary aperture 81 and the downstream end 50b. Each second aperture 89 serves to introduce air into the flame tube and/or to cool the third partition 50, especially by a film.

In the embodiment represented, the third partition 50 is substantially equidistant from the longitudinal axis X-X of the turbine engine from its upstream end 50a to its downstream end 50b. The third partition 50 has a plurality of second apertures 89 passing therethrough, which extend axially from the primary apertures 81 to the downstream end 50b and by being substantially uniformly distributed. The second apertures 89 extend along substantially the entire circumferential length of the third partition 50.

The third wall 50 has a thickness which is substantially constant from its upstream end 50a to its downstream end 50b. The thickness of the third partition 50 is for example between 35% and 55% of the thickness of the inner wall 26.

The fourth partition 52 of the inner wall 26 is an inner partition of the inner wall 26. It delimits especially the inner wall 26 radially inwardly. The fourth partition 52 is radially spaced from the third partition 50 to form the second cooling duct 51 with the third partition 50.

The fourth partition 52 extends axially from an upstream end 52a to a downstream end 52b. It is connected at the upstream end 52a to the second inlet wall 56. It is connected at the downstream end 52b to the second outlet wall 58. It extends along substantially the entire circumferential length of the inner wall 26.

The fourth partition 52 is free of cooling holes in the embodiment represented. It has only the primary apertures 81 and the dilution apertures 82 passing therethrough.

In the embodiment represented, the fourth partition 52 approaches the longitudinal axis X-X of the turbine engine from its upstream end 52a to an intermediate portion 53 of the fourth partition 52 which is located strictly between the upstream end 52a and the downstream end 52b. The intermediate portion 53 is especially located axially substantially equidistant from the upstream end 52a and the downstream end 52b. The fourth partition 52 extends away from the longitudinal axis X-X of the turbine engine from the intermediate portion 53 to its downstream end 52b.

The fourth partition 52 has a thickness that is substantially constant from its upstream end 52a to its downstream end 52b. The thickness of the fourth partition 52 is for example between 12% and 35% of the thickness of the inner wall 26.

The second cooling duct 51 comprises a second air inlet 55 and a second air outlet 57. It is delimited radially outwardly by the third partition 50 and radially inwards by the fourth partition 52. It is delimited upstream by the upstream end 50a of the third partition 50, by the upstream end 52a of the fourth partition 52 and by a second inlet wall 56. It is delimited downstream by the downstream end 50b of the third partition 50, by the downstream end 52b of the fourth partition 52 and by a second outlet wall 58. The second cooling duct 51 is configured to cool the inner wall 26, especially by a film through the second apertures 89, as well as by contact of the cooling air with the third partition 50 and with the fourth partition 52.

The radial extent of the second cooling duct 51 narrows downstream from the second inlet wall 56 to the intermediate portion 53 of the fourth partition 52. The ratio of the radial extent e5 at the intermediate portion 53 to the radial extent e4 at the second inlet wall 56 is for example between 35% and 45%.

The radial extent of the second cooling duct 51 increases downstream from the intermediate portion 53 to the second outlet wall 58. The ratio of the radial extent e5 at the intermediate portion 53 to the radial extent e6 at the second outlet wall 58 is for example between 55% and 65%.

The second air inlet 55 comprises the second inlet wall 56. The second inlet wall 56 extends from the third partition 50 to the fourth partition 52. It is tilted with respect to the radial direction upstream towards the fourth partition 52. It is mechanically connected to the third upstream attachment edge 75 and to the fourth upstream attachment edge 77 in proximity to the upstream end 50a of the third partition 50. The second inlet wall 56 extends along substantially the entire circumferential length of the inner wall 26.

The second inlet wall 56 is configured to partially seal the second cooling duct 51 upstream, by regulating the air velocity and pressure at the second air inlet 55.

The second inlet wall 56 has at least one second inlet aperture 86 passing therethrough, which has an axial component. Each second inlet aperture 86 serves to introduce air substantially axially into the second cooling duct 51 through the second inlet wall 56.

In the embodiment represented, the second inlet wall 56 has two rows of second inlet apertures 86 passing therethrough, which extend along substantially the entire circumferential length of the second inlet wall 56 and which are radially spaced from each other. Each of the second inlet apertures 86 is oriented substantially axially along the longitudinal axis X-X of the turbine engine.

The second air outlet 57 comprises the second outlet wall 58. The second outlet wall 58 extends from the third partition 50 to the fourth partition 52. It is oriented substantially radially serving as a planar support for a flange for attachment to a turbine wall to which it is to be connected. The second outlet wall 58 extends along substantially the entire circumferential length of the inner wall 26.

The second outlet wall 58 is configured to partially seal the second cooling duct 51 in a downstream direction, by regulating the air velocity and pressure at the second air outlet 57. It is configured to mechanically connect the inner wall 26 to the turbine wall attachment flange.

The second outlet wall 58 has at least one second outlet aperture 88 therethrough which has an axial component. Each second outlet aperture 88 serves to discharge air substantially axially into the second cooling duct 51 through the second outlet wall 58. The second outlet wall 58 has at least one second attachment aperture 78 passing therethrough from the inner wall 26 to a turbine wall of the turbine engine, for example a high pressure turbine wall of the turbine engine. Each second attachment aperture 78 is to receive an attachment member such as a screw of a nut for attaching the inner wall 26 to the turbine wall.

In the embodiment represented, the second outlet wall 58 has a row of second outlet apertures 88 passing therethrough, which extends along substantially the entire circumferential length of the second outlet wall 58. Each of the second outlet apertures 88 is oriented substantially axially along the longitudinal axis X-X of the turbine engine. The second outlet wall 58 has a row of second attachment apertures 78 passing therethrough, which extends along substantially the entire circumferential length of the second outlet wall 58 and which is radially spaced from the row of second outlet apertures 88.

With joint reference to FIGS. 7 and 10, the internal attachment ferrule 90 of the inner wall 26 projects radially inwardly and upstream from the second outlet wall 58. The internal attachment ferrule 90 comprises a downstream portion 94 and an upstream attachment edge 92. The internal attachment collar 90 serves to attach the inner wall 26 to the internal casing wall 24 of the combustion chamber 2.

The downstream portion 94 extends axially upstream from the second outlet wall 58. It comprises a plurality of downstream holes 95. The upstream attachment rim 92 extends radially inwardly from an upstream end of the downstream portion 94. The upstream attachment rim 92 comprises a plurality of attachment apertures 93 for attaching the upstream attachment rim 92 to an attachment rim of the internal casing wall 24 supporting it, by means of attachment members each comprising, for example, a screw and a nut.

The outer wall 25 and the inner wall 26 of the combustion chamber 2 are each manufactured by selective melting or by selective sintering on a powder bed, especially by a laser. In other words, the outer wall 25 and the inner wall 26 are each made by additive manufacturing in the embodiment represented.

By virtue of the combustion chamber 2, cooling of the outer wall 25 and cooling of the inner wall 26 are improved.

In particular, cooling air circulation from the first inlet wall 46 to the first outlet wall 48 of the first cooling duct 41 makes it possible to improve cooling of the outer wall 25.

The first cooling duct 41 especially promotes continuous and homogeneous cooling air circulation in the outer wall 25. Cooling the outer wall 25 is all the more effective as cooling air circulating in the first cooling duct 41 tends to be separated from hot combustion gases, for example by the first partition 40.

The first cooling duct 41 does not, for example, interfere with combustion in the flame tube of the combustion chamber 2 by allowing combustion to be supplied by a primary flux through the primary apertures 81 and by a dilution flux through the dilution apertures 82 of the outer wall 25.

Cooling of the outer wall 25 is further improved by promoting circulation of cooling air from the first inlet apertures 85 of the first inlet wall 46 to the first outlet apertures 87 of the first outlet wall 48.

The second apertures 89 in the outer wall 25 especially allow for film cooling of the first wall 40 which is close to the hot combustion gases in the flame tube, to improve cooling of the first wall 40. The second apertures 89 also allow additional air to be introduced into the flame tube of the combustion chamber 2 through the outer wall 25, to promote combustion.

As the first cooling duct 41 narrows downstream from the first air inlet cooling air in the first cooling duct 41 is accelerated, thereby increasing the cooling rate to cool the outer wall 25. Cooling air pressure losses are also limited when cooling air enters the first cooling duct 41.

The first outlet wall 48 especially allows the outer wall 25 to be connected to a turbine wall, while discharging air from the first cooling duct 41. The air pressure tends to increase at the first outlet 47, for example to supply a high pressure turbine with cooling air.

The outer wall 25 can be additively manufactured, allowing it to have a complex shape especially due to the first partition 40, the second partition 42 and the first cooling duct 41.

Furthermore, and in particular, the cooling air circulation from the second inlet wall 56 to the second outlet wall 58 of the second cooling duct 51 improves cooling of the inner wall 26.

The second cooling duct 51 especially promotes the continuous and homogeneous cooling air circulation in the inner wall 26. Cooling of the inner wall 26 is all the more effective as the cooling air circulating in the second cooling duct 51 tends to be separated from hot combustion gases, for example by the third partition 50.

The second cooling duct 51 does not, for example, interfere with combustion in the flame tube of the combustion chamber 2 by allowing combustion to be supplied by a primary flux through the primary apertures 81 and by a dilution flux through the dilution apertures 82 of the inner wall 26.

Cooling of the inner wall 26 is further improved by promoting circulation of cooling air from the second inlet apertures 86 of the second inlet wall 56 to the second outlet apertures 88 of the second outlet wall 88.

The second apertures 89 in the inner wall 26 especially allow for film cooling of the third wall 50 which is close to the hot combustion gases in the flame tube, to improve cooling of the third wall 50. The second apertures 89 also allow additional air to be introduced into the flame tube of the combustion chamber 2 through the inner wall 26, to promote combustion.

As the second cooling duct 51 narrows downstream from the second air inlet 55, cooling air in the second cooling duct 51 is accelerated, thereby increasing the cooling rate to cool the inner wall 26. Cooling air pressure losses are also limited when cooling air enters the second cooling duct 5s1.

The second outlet wall 58 especially allows the inner wall 26 to be connected to a turbine wall, while discharging air from the second cooling duct 51. The air pressure tends to increase at the second outlet 57 of the second cooling duct 51, for example to supply a high pressure turbine with cooling air.

The inner wall 26 can be additively manufactured, allowing it to have a complex shape especially due to the third partition 50, the fourth partition 52 and the second cooling duct 51.

Of course, various modifications can be made by the person skilled in the art to the invention just described without departing from the scope of the invention. In particular, the structure of the tooling 20, the structure of the wall 10 and the manufacturing method 100 may vary.

The number, geometry and distribution of the first cooling apertures 40, and the second cooling apertures 44 may vary. For example, the wall 10 may comprise only first cooling apertures 40.

Further alternatively, at least one second cooling aperture 44 in the wall may be free of a rounded part. In this case, the inlet 43 and/or outlet 45 of the wall may be machined following the additive manufacturing step 105.

Alternatively, the wall 10 is manufactured in proximity to the first cooling apertures 40 with an upper zone 19*c* having a thickness of, for example, less than or equal to 0.06 mm.

In this case, the thickness parameter of the upskin zone 19*c*, also known as the "thickness of the upskin", is especially defined as the thickness of all the layers of the upper zone 19*c* which is manufactured with a so-called Upskin parameterisation.

With a thin upskin zone 19*c*, the manufacturing defects of each first cooling aperture 40 are reduced compared to a wall 10 which is additively manufactured according to a method known from the state of the art. In particular, unwanted material deposits at the bottom of each first cooling aperture 40 remain limited.

Each upper zone 19*c* of the wall 10 is, for example, manufactured by a third energy input per unit length Ec on the powder bed 17 which is between 0.1300 J/mm and 0.1950 J/mm, preferably 0.1625 J/mm.

In particular, the third energy input per unit length Ec is substantially equal to the second energy input per unit length Eb with double energy exposure of an upper zone 19*c* with respect to an intermediate zone 19*b*.

The low value of the first energy input per unit length Ea relative to the third energy input per unit length Ec makes it possible especially to melt/agglomerate less powder 17 when manufacturing a lower zone 19*a* than when manufacturing an upper zone 19*c*. This results in a reduction in manufacturing defects of the first cooling aperture 40 by increasing the volume of the lower zone 19*a*.

Generally speaking, the first energy input per unit length Ea, the second energy input per unit length Eb and/or the third energy input per unit length Ec may have different values, especially along the wall 10. The third energy input per unit length Ec may especially have a different value than the second energy input per unit length Eb.

The manufacturing method 100 may not comprise machining 110 of the wall blank 10 and/or machining 112 of the manufacturing plate 28.

In particular, only the outer wall 25 may comprise two partitions 40, 42. In this case, the cooling of the outer wall 25 is especially improved with respect to that of the inner wall 26.

Further alternatively, only the inner wall 26 may comprise two partitions 52. In this case, cooling of the inner wall 26 is especially improved with respect to that of the outer wall 25.

The air inlet of the first cooling duct 41 may be oriented radially and/or at a distance from the first inlet wall 46. The air outlet of the first cooling duct 41 may be oriented radially and/or at a distance from the first outlet wall 48.

The air inlet of the second cooling duct 51 may be oriented radially and/or at a distance from the second inlet wall 56. The air outlet of the second cooling duct 51 may be oriented radially and/or at a distance from the second outlet wall 58.

Alternatively, the first partition wall 40 is free of cooling apertures. Alternatively, the third partition wall 50 may be free of cooling apertures.

Alternatively, the first upstream attachment rim 70 is spaced apart from the first air inlet 45 of the first cooling duct 41, without promoting air inlet into the first cooling duct 41.

The second upstream attachment rim 72 may be spaced from the second inlet 55 of the second cooling duct 51, without promoting air inlet into the second cooling duct 51.

Alternatively, the radial extent of the first cooling duct 41 is substantially constant. The radial extent of the second cooling duct 51 may be substantially constant.

Alternatively, the first outlet wall 48 is free of attachment apertures 74. In this case, the outer wall 25 may comprise an additional attachment flange for attachment to a turbine casing.

The second outlet wall 58 may be free of attachment apertures 78. In this case, the inner wall 26 may include an additional attachment flange for attachment to a turbine casing.

The outer wall 25 and/or the inner wall 26 may be free of stiffeners, for example when the thickness of their partitions 40, 50, 42, 52 is sufficient to give them satisfactory mechanical rigidity.

The outer wall 25 and/or the inner wall 26 may be manufactured by methods other than selective melting or selective sintering on a powder bed, especially by foundry or by another additive manufacturing method.

What is claimed is:

1. A method for additive manufacturing of a wall for a turbine engine, wherein the wall comprises a first cooling aperture, wherein the manufacturing method comprises additively manufacturing the wall by selective melting or selective sintering on a powder bed, wherein the wall is at least partially manufactured around the first cooling aperture with a lower zone at least partially delimiting a lower side of said first cooling aperture and an upper zone at least partially delimiting an upper side of said first cooling aperture, said lower side being further from a manufacturing plate than the upper side, said lower zone having a total thickness in a movement axis of a manufacturing plate of the powder bed of between 0.06 and 0.22 mm, wherein the lower zone is manufactured with a first energy input per unit length which is less than a second energy input per unit length for manufacturing an intermediate zone which forms most of the volume of the wall, wherein the intermediate zone delimits an intermediate side of the first cooling aperture in line with the first cooling aperture in the movement axis of the manufacturing plate, wherein the wall is manufactured around the first cooling aperture with the upper zone which is manufactured by a third energy input per unit length on the powder bed which is between 0.1300 J/mm and 0.1950 J/mm, and wherein the third energy input per unit length is equal to the second energy input per unit length with double energy exposure of the upper zone with respect to the intermediate zone.

2. The additive manufacturing method according to claim 1, wherein the lower zone is manufactured with a minimum lower zone length that is between 0.01 and 0.4 mm, wherein the minimum lower zone length is a minimum powder solidification length for the lower zone to be able to be formed.

3. The additive manufacturing method according to claim 1, wherein the lower zone has a minimum length which is between 0.01 and 0.4 mm and/or wherein the lower zone has a total thickness which is between 0.06 and 0.22 mm.

4. The additive manufacturing method according to claim 3, wherein the lower zone has a minimum length which is substantially equal to 0.05 mm, and/or the lower zone has a total thickness which is substantially equal to 0.12 mm.

5. The additive manufacturing method according to claim 1, wherein the wall is manufactured around the first cooling aperture without an upper zone or with an upper zone thickness that is less than or equal to 0.06 mm, wherein the upper zone is manufactured with an energy input per unit length that is substantially equal to that used to manufacture an intermediate zone that forms most of the volume of the wall but with a double energy exposure relative to the intermediate zone.

6. The additive manufacturing method according to claim 1, wherein the lower zone is located in an upper portion of the first cooling aperture when the wall is manufactured substantially vertically by additive manufacturing on a support.

7. The additive manufacturing method according to claim 6, wherein the support is a manufacturing plate.

8. The additive manufacturing method according to claim 1, wherein the lower zone is manufactured by a first energy input per unit length on the powder bed which is between 0.0200 J/mm and 0.0300 J/mm, and/or wherein an intermediate zone around the first cooling aperture is manufactured by a second energy input per unit length to the powder bed which is between 0.1300 J/mm and 0.1950 J/mm.

9. The additive manufacturing method according to claim 8, wherein the lower zone is manufactured by a first energy input per unit length on the powder bed which is 0.0250 J/mm, and/or wherein an intermediate zone around the first cooling aperture is manufactured by a second energy input per unit length to the powder bed which is 0.1625 J/mm.

10. The additive manufacturing method according to claim 1, wherein the wall is manufactured around the first cooling aperture with an upper zone which is manufactured by the third energy input per unit length on the powder bed which is 0.1625 J/mm.

11. The additive manufacturing method according to claim 1, wherein the first cooling aperture extends about a longitudinal axis of the first cooling aperture which is orthogonal to an external surface of the wall.

12. The additive manufacturing method according to claim 11, wherein the wall extends perpendicularly to a manufacturing plate during additive manufacturing of the wall.

13. The additive manufacturing method according to claim 1, wherein the first cooling aperture is digitally modelled with a substantially oval transverse surface to be manufactured by selective melting or selective sintering on the powder bed, such that the first cooling aperture is manufactured with a substantially circular transverse cross-section.

14. The additive manufacturing method according to claim 1, wherein the wall comprises at least one second cooling aperture which is oriented about a longitudinal axis of the second cooling aperture which is tilted with respect to an external surface of the wall by an angle of between 5° and 45° in at least one cross-sectional plane of the wall.

15. The additive manufacturing method according to claim 1, wherein the wall comprises at least one second cooling aperture which is oriented about a longitudinal axis of the second cooling aperture which is tilted with respect to an external surface of the wall by an angle of 20° in at least one cross-sectional plane of the wall.

16. The additive manufacturing method according to claim 15, wherein an inlet and/or an outlet of the second cooling aperture is manufactured such that said inlet and/or said outlet comprises a rounded part.

17. The additive manufacturing method according to claim 1, wherein said total thickness of the lower zone is measured in a longitudinal direction of the wall.

18. The additive manufacturing method according to claim 1, wherein the wall is manufactured around the first cooling aperture with an upper zone thickness that is less than or equal to 0.06 mm, wherein the upper zone delimits an upper side of the first cooling aperture closer to the manufacturing plate in the movement axis of the manufacturing plate.

* * * * *